United States Patent
Momchilov et al.

(10) Patent No.: US 9,471,335 B2
(45) Date of Patent: *Oct. 18, 2016

(54) SHELL INTEGRATION FOR AN APPLICATION EXECUTING REMOTELY ON A SERVER

(71) Applicant: Citrix Systems, Inc., Fort Lauderdale, FL (US)

(72) Inventors: Georgy Momchilov, Coconut Creek, FL (US); Abraham Mir, Pembroke Pines, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/806,740

(22) Filed: Jul. 23, 2015

(65) Prior Publication Data

US 2015/0326690 A1    Nov. 12, 2015

Related U.S. Application Data

(63) Continuation of application No. 13/474,238, filed on May 17, 2012.

(60) Provisional application No. 61/488,593, filed on May 20, 2011.

(51) Int. Cl.
| | |
|---|---|
| *G06F 9/44* | (2006.01) |
| *H04L 29/06* | (2006.01) |
| *G06F 9/54* | (2006.01) |
| *H04L 29/08* | (2006.01) |
| *G06F 9/445* | (2006.01) |

(52) U.S. Cl.
CPC ........... *G06F 9/4443* (2013.01); *G06F 9/4445* (2013.01); *G06F 9/54* (2013.01); *H04L 67/303* (2013.01); *H04L 67/38* (2013.01); *G06F 9/4451* (2013.01); *H04L 67/22* (2013.01); *H04L 67/24* (2013.01); *H04L 67/34* (2013.01)

(58) Field of Classification Search
CPC ....... H04L 67/24; H04L 67/22; H04L 67/34; H04L 67/38; H06F 9/4443; G06F 9/4451; G06F 9/4443; G06F 9/4445
See application file for complete search history.

(56) References Cited

U.S. PATENT DOCUMENTS

| | | | |
|---|---|---|---|
| 5,684,955 A | 11/1997 | Meyer et al. | |
| 6,295,276 B1 * | 9/2001 | Datta | ................ H04L 29/12009 370/218 |
| 6,493,341 B1 * | 12/2002 | Datta | .................. H04L 12/5692 370/392 |
| 6,687,745 B1 | 2/2004 | Franco et al. | |
| 6,950,991 B2 | 9/2005 | Bloomfield et al. | |
| 7,509,672 B1 | 3/2009 | Horwitz et al. | |

(Continued)

*Primary Examiner* — Jimmy H Tran

(74) *Attorney, Agent, or Firm* — Banner & Witcoff, Ltd.

(57) ABSTRACT

Methods and systems described herein are directed to providing shell integration for an application executing remotely on a server. By providing shell integration for the application executing on the server, the system provides a seamless user experience, in which a user perceives minor or no differences between applications executing locally and those executing remotely. New usability enhancements in operating systems, such as Destination Lists (a.k.a. Jump Lists), Thumbnail Toolbars, Overlay Icons, Progress Bars, and integration of web sites with the Shell, may work only in a local OS environment and fail to integrate at all in a remote environment. One of the goals of the invention is to integrate these Shell capabilities and achieve a unified desktop experience for the user.

17 Claims, 22 Drawing Sheets

(56) References Cited

U.S. PATENT DOCUMENTS

| | | |
|---|---|---|
| 7,779,034 B2 | 8/2010 | Pedersen et al. |
| 7,779,091 B2 | 8/2010 | Wilkinson et al. |
| 7,784,031 B1 | 8/2010 | Borg et al. |
| 7,814,234 B2 | 10/2010 | Hawkins et al. |
| 7,890,570 B2 | 2/2011 | Mazzaferri |
| 7,934,017 B2 | 4/2011 | Wilkinson |
| 8,010,701 B2 | 8/2011 | Wilkinson et al. |
| 8,185,581 B2 | 5/2012 | Duggal |
| 8,245,129 B2 | 8/2012 | Wilkinson et al. |
| 8,346,909 B2 | 1/2013 | Dan et al. |
| 8,606,889 B2 | 12/2013 | Kazan et al. |
| 8,607,158 B2 | 12/2013 | Molander et al. |
| 8,655,738 B2 | 2/2014 | Pombo et al. |
| 8,667,050 B2 | 3/2014 | Momchilov |
| 8,713,474 B2 | 4/2014 | Desai et al. |
| 8,769,428 B2 | 7/2014 | Mir et al. |
| 8,806,360 B2 | 8/2014 | Cramer et al. |
| 8,866,701 B2 | 10/2014 | Momchilov et al. |
| 8,892,776 B2 | 11/2014 | Wilkinson et al. |
| 8,893,013 B1 | 11/2014 | Groves et al. |
| 9,032,062 B2 | 5/2015 | Momchilov |
| 2003/0187955 A1 | 10/2003 | Koch |
| 2004/0143669 A1 | 7/2004 | Zhao et al. |
| 2004/0183756 A1 | 9/2004 | Freitas et al. |
| 2005/0010873 A1 | 1/2005 | Nakamura |
| 2005/0021935 A1 | 1/2005 | Schillings et al. |
| 2005/0066037 A1 | 3/2005 | Song et al. |
| 2005/0165925 A1 | 7/2005 | Dan et al. |
| 2006/0080639 A1 | 4/2006 | Bustelo et al. |
| 2006/0090154 A1 | 4/2006 | Bustelo et al. |
| 2007/0094597 A1 | 4/2007 | Rostom |
| 2007/0192322 A1 | 8/2007 | Dandekar et al. |
| 2007/0239859 A1 | 10/2007 | Wilkinson et al. |
| 2008/0005238 A1 | 1/2008 | Hall et al. |
| 2008/0034071 A1 | 2/2008 | Wilkinson et al. |
| 2008/0104195 A1 | 5/2008 | Hawkins et al. |
| 2008/0126929 A1 | 5/2008 | Bykov |
| 2008/0133777 A1 | 6/2008 | Wilkinson |
| 2008/0147745 A1 | 6/2008 | Wilkinson et al. |
| 2008/0147787 A1 | 6/2008 | Wilkinson et al. |
| 2009/0070404 A1* | 3/2009 | Mazzaferri ............ G06F 9/542 709/202 |
| 2009/0199122 A1 | 8/2009 | Deutsch et al. |
| 2009/0199133 A1 | 8/2009 | Deutsch et al. |
| 2010/0198730 A1 | 8/2010 | Ahmed et al. |
| 2010/0274903 A1 | 10/2010 | Wookey et al. |
| 2010/0281528 A1 | 11/2010 | Hayton et al. |
| 2010/0299187 A1 | 11/2010 | Duggal |
| 2010/0299436 A1 | 11/2010 | Khalid et al. |
| 2011/0179149 A1 | 7/2011 | Kazan et al. |
| 2011/0307880 A1 | 12/2011 | Hilerio et al. |
| 2012/0096364 A1 | 4/2012 | Wilkinson et al. |
| 2012/0096365 A1 | 4/2012 | Wilkinson et al. |
| 2012/1008471 | 4/2012 | Desai et al. |
| 2012/0166959 A1* | 6/2012 | Hilerio ................ G06Q 10/00 715/738 |
| 2012/0226742 A1 | 9/2012 | Momchilov et al. |
| 2014/0201679 A1 | 7/2014 | Desai et al. |

* cited by examiner

SHELL INTEGRATION FOR AN APPLICATION EXECUTING REMOTELY ON A SERVER

CROSS REFERENCE TO RELATED APPLICATIONS

This application is a continuation of U.S. patent application Ser. No. 13/474,238, entitled "Shell Integration for an Application Executing Remotely on a Server," filed May 17, 2012.

FIELD

The present disclosure relates generally to applications executing remotely on a server. In particular, the present disclosure is directed to providing shell integration for an application executing remotely on a server.

BACKGROUND

Through the advancements in computing and networking capabilities, companies and users are increasingly using remotely executed applications. However, in many instances, the use of remotely executed applications may provide a cumbersome user experience, in which visual and functional usability enhancements of a local operating system are not integrated into the remote environment. Further, the absence of such integration may cause confusion for the user when they attempt to interact simultaneously with the remotely executing applications.

SUMMARY

In light of the foregoing background, the following presents a simplified summary of the present disclosure in order to provide a basic understanding of some aspects described herein. This summary is not an extensive overview, and it is not intended to identify key or critical elements or to delineate the scope of the claims. The following summary merely presents various described aspects in a simplified form as a prelude to the more detailed description provided below.

The methods and systems described herein are directed to providing shell integration for an application executing remotely on a server. By providing shell integration for the application executing on the server, the system provides a seamless user experience, in which a user perceives minor or no differences between applications executing locally and those executing remotely. New usability enhancements in operating systems, such as Destination Lists (a.k.a. Jump Lists), Thumbnail Toolbars, Overlay Icons, Progress Bars, and integration of web sites with the Shell (IE9), may work only in a local OS environment and fail to integrate at all in a remote environment. One of the goals of the invention is to integrate these Shell capabilities and achieve a unified desktop experience for the user.

Destination Lists constitute a mini start menu for each app, which provides easy access to content and tasks that users perform every day. Destination Lists permit users to open the application, pin or unpin the application, and close windows. Destination Lists may contain user tasks, custom categories, known categories (such as "Recent Items" or "Frequently Used Items"), pinned categories. In some embodiments, shell items are pinnable. Destination Lists may range from blank ones to any permutation of default, known or custom categories, shell links, and shell items. Destination Lists may be static (created at installation of the application) or dynamic. Destinations Lists may be separate (not grouped) for local and remote applications. Destination Lists may be merged (grouped) for local and remote applications. In some embodiments, within a list, either merging or separating individual categories and items may be based on either local or remote access.

Thumbnail toolbars provide access to a particular window's key commands without making the user restore or activate the window of the application. An active toolbar control can be embedded in that window's thumbnail preview.

An application can communicate certain notifications and status to the user through its taskbar button by the display of small overlays on the button. Icon overlays serve as a contextual notification of status, and are intended to negate the need for a separate notification area status icon.

A taskbar button can be used to display a progress bar. This enables a window to provide progress information to the user without that user having to switch to the window itself. The user can stay productive in another application while seeing at a glance the progress of one or more operations occurring in other windows. The taskbar button can also show that the operation is paused or has encountered an error and requires user intervention.

According to an aspect, a method may include receiving, at a local computing device, a destination list from a remote computing device, said destination list corresponding to an application executing on the remote computing device; instantiating, at the local computing device, a stub executable program based on the corresponding application executing on a remote computing device; and associating the destination list with the stub executable program.

Another aspect may further include outputting for display a user interface comprising the destination list; intercepting, at the client device, user input selecting an item on the destination list corresponding to an item in the destination list received from the remote computing device; and sending the intercepted input to the remote computing device for delivery to the application.

Some aspects may include generating a local destination list corresponding to the received destination list, wherein said local destination list comprises at least one user selectable item not in the received destination list; and outputting for display a combined destination list based on the received destination list and the local destination list.

Other aspects may include one or more other features described herein, and may include computer readable media programmed with instructions that, when executed, configure a device to perform one more of the recited features.

Another aspect may include computer readable media storing instructions for configuring a device to display a user interface including a taskbar icon corresponding to both a first application executing on the local computing device and a second application executing on a remote computing device, where the graphical user interface is configured, upon receiving first user input associated with the taskbar icon, to display a destination list including at least one list item corresponding to a destination on the local computing device and at least one destination list item corresponding to a destination on the remote computing device.

In some variants, the destination list may be divided into local and remote sections, and/or may include a thumbnail toolbar item, overlay indicia, and/or progress bar information.

The details of various embodiments of the methods and systems described herein are set forth in the accompanying drawings and the description below.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

Figure 1A:
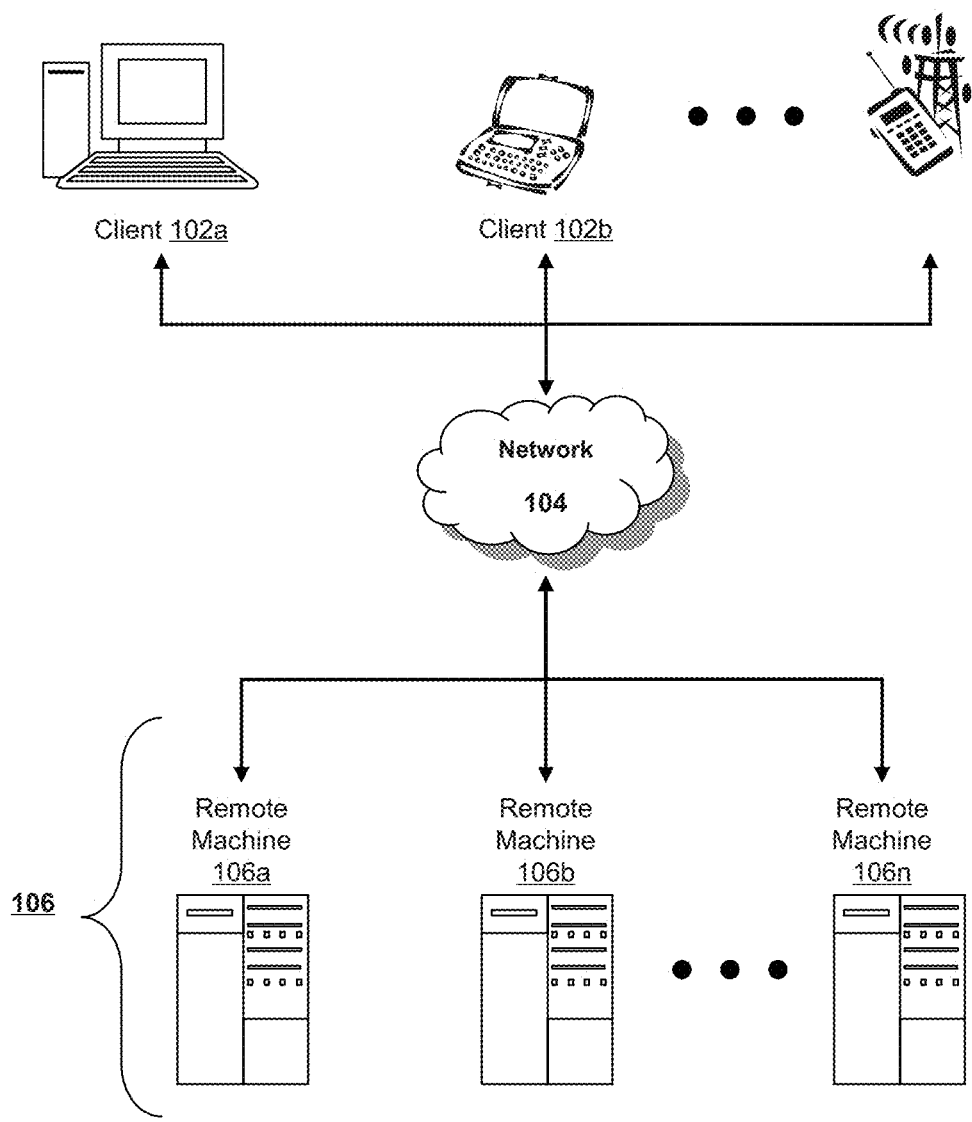
FIG. 1A illustrates embodiments of network environments that provide remote access to computing devices that can execute application programs according to one or more aspects described herein.

The features and advantages of the methods and systems described herein will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

In the following description of the various embodiments, reference is made to the accompanying drawings, which form a part hereof, and in which is shown by way of illustration various embodiments in which aspects described herein may be practiced. It is to be understood that other embodiments may be utilized and structural and functional modifications may be made without departing from the scope and spirit of the present disclosure.

For purposes of reading the description of the various embodiments below, the following descriptions of the sections of the specification and their respective contents may be helpful:

Section A describes a network environment and computing environment which may be useful for practicing one or more embodiments described herein;

Section B describes embodiments of systems for providing shell integration for applications executing remotely on a server; and Section C describes embodiments of methods for providing shell integration for applications executing remotely on a server.

Various aspects of embodiments may be combined or used separately. Each described embodiment is illustrative in nature, and not intended to be limiting unless explicitly so stated.

Section A: Network and Computing Environment

As will be appreciated by one of skill in the art upon reading the following disclosure, various aspects described herein may be embodied as a method, a data processing system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

FIG. 1A illustrates one embodiment of a computing environment 101 that includes one or more client machines 102A-102N (generally referred to herein as "client machine(s) 102") that are in communication with one or more servers 106A-106N (generally referred to herein as "server(s) 106"). Installed in between the client machine(s) 102 and server(s) 106 is a network.

In one embodiment, the computing environment 101 can include an appliance installed between the server(s) 106 and client machine(s) 102. This appliance can manage client/server connections, and in some cases can load balance client connections amongst a plurality of backend servers.

The client machine(s) 102 can, in some embodiments, be referred to as a single client machine 102 or a single group of client machines 102, while server(s) 106 may be referred to as a single server 106 or a single group of servers 106. In one embodiment a single client machine 102 communicates with more than one server 106, while in another embodiment a single server 106 communicates with more than one client machine 102. In yet another embodiment, a single client machine 102 communicates with a single server 106.

A client machine 102 can, in some embodiments, be referenced by any one of the following terms: client machine(s) 102; client(s); client computer(s); client device(s); client computing device(s); local machine; remote machine; client node(s); endpoint(s); endpoint node(s); or a second machine. The server 106, in some embodiments, may be referenced by any one of the following terms: server(s), local machine; remote machine; server farm(s), host computing device(s), or a first machine(s).

In one embodiment, the client machine 102 can be a virtual machine 102C. In some embodiments, the virtual machine 102C can be managed by a hypervisor such as the Xen hypervisor, developed sold by Citrix Systems, Inc., Hyper-V, developed and sold by Microsoft Corp., ESX, developed and sold by EMC, or any other hypervisor.

The client machine 102 can in some embodiments execute, operate or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions. Still other embodiments include a client device 102 that displays application output generated by an application remotely executing on a server 106 or other remotely located machine. In these embodiments, the client device 102 can display the application output in an application window, a browser, or other output window. In one embodiment, the application is a desktop, while in other embodiments the application is an application that generates a desktop.

The server 106, in some embodiments, executes a remote presentation client or other client or program that uses a thin-client or remote-display protocol to capture display output generated by an application executing on a server 106 and transmits the application display output to a remote client 102. The thin-client or remote-display protocol can be any one of the following protocols: the Independent Computing Architecture (ICA) protocol manufactured by Citrix Systems, Inc. of Ft. Lauderdale, Fla.; or the Remote Desktop Protocol (RDP) manufactured by the Microsoft Corporation of Redmond, Wash.

The computing environment can include more than one server 106A-106N such that the servers 106A-106N are logically grouped together into a server farm 106. The server farm 106 can include servers 106 that are geographically dispersed and logically grouped together in a server farm 106, or servers 106 that are located proximate to each other and logically grouped together in a server farm 106. Geographically dispersed servers 106A-106N within a server farm 106 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments the server farm 106 may be administered as a single entity, while in other embodiments the server farm 106 can include multiple server farms 106.

In some embodiments, a server farm 106 can include servers 106 that execute a substantially similar type of operating system platform (e.g., WINDOWS NT, manufactured by Microsoft Corp. of Redmond, Wash., UNIX, LINUX, or SNOW LEOPARD.) In other embodiments, the server farm 106 can include a first group of servers 106 that execute a first type of operating system platform, and a second group of servers 106 that execute a second type of operating system platform. The server farm 106, in other embodiments, can include servers 106 that execute different types of operating system platforms.

The server 106, in some embodiments, can be any server type. In other embodiments, the server 106 can be any of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server 106 executing an active directory; or a server 106 executing an application acceleration program that provides firewall functionality, application functionality, or load balancing functionality. In some embodiments, a server 106 may be a RADIUS server that includes a remote authentication dial-in user service. In embodiments where the server 106 comprises an appliance, the server 106 can be an appliance manufactured by any one of the following manufacturers: the Citrix Application Networking Group; Silver Peak Systems, Inc; Riverbed Technology, Inc.; F5 Networks, Inc.; or Juniper Networks, Inc. Some embodiments include a first server 106A that receives requests from a client machine 102, forwards the request to a second server 106B, and responds to the request generated by the client machine 102 with a response from the second server 106B. The first server 106A can acquire an enumeration of applications available to the client machine 102 and well as address information associated with an application server 106 hosting an application identified within the enumeration of applications. The first server 106A can then present a response to the client's request using a web interface, and communicate directly with the client 102 to provide the client 102 with access to an identified application.

The server 106 can, in some embodiments, execute any one of the following applications: a thin-client application using a thin-client protocol to transmit application display data to a client; a remote display presentation application; any portion of the CITRIX ACCESS SUITE by Citrix Systems, Inc. like the XENAPP or CITRIX PRESENTATION SERVER; MICROSOFT WINDOWS Terminal Services manufactured by the Microsoft Corporation; or an ICA client, developed by Citrix Systems, Inc. Another embodiment includes a server 106 that is an application server such as: an email server that provides email services such as MICROSOFT EXCHANGE manufactured by the Microsoft Corporation; a web or Internet server; a desktop sharing server; a collaboration server; or any other type of application server. Still other embodiments include a server 106 that executes any one of the following types of hosted servers applications: GOTOMEETING provided by Citrix Online Division, Inc.; WEBEX provided by WebEx, Inc. of Santa Clara, Calif.; or Microsoft Office LIVE MEETING provided by Microsoft Corporation.

Client machines 102 can, in some embodiments, be a client node that seeks access to resources provided by a server 106. In other embodiments, the server 106 may provide clients 102 or client nodes with access to hosted resources. The server 106, in some embodiments, functions as a master node such that it communicates with one or more clients 102 or servers 106. In some embodiments, the master node can identify and provide address information associated with a server 106 hosting a requested application, to one or more clients 102 or servers 106. In still other embodiments, the master node can be a server farm 106, a client 102, a cluster of client nodes 102, or an appliance.

One or more clients 102 and/or one or more servers 106 can transmit data over a network 104 installed between machines and appliances within the computing environment 101. The network 104 can comprise one or more sub-networks, and can be installed between any combination of the clients 102, servers 106, computing machines and appliances included within the computing environment 101. In some embodiments, the network 104 can be: a local-area network (LAN); a metropolitan area network (MAN); a wide area network (WAN); a primary network 104 comprised of multiple sub-networks 104 located between the client machines 102 and the servers 106; a primary public network 104 with a private sub-network 104; a primary private network 104 with a public sub-network 104; or a primary private network 104 with a private sub-network 104. Still further embodiments include a network 104 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; or a network 104 that includes a wireless link where the wireless link can be an infrared channel or satellite band. The network topology of the network 104 can differ within different embodiments, possible network topologies include: a bus network topology; a star network topology; a ring network topology; a repeater-based network topology; or a tiered-star network topology. Additional embodiments may include a network 104 of mobile telephone networks that use a protocol to communicate among mobile devices, where the protocol can be any one of the following: AMPS; TDMA; CDMA; GSM; GPRS UMTS; EV-DO; LTE; or any other protocol able to transmit data among mobile devices like 802.11, Bluetooth, and Near Field Communication.

Figure 1B:
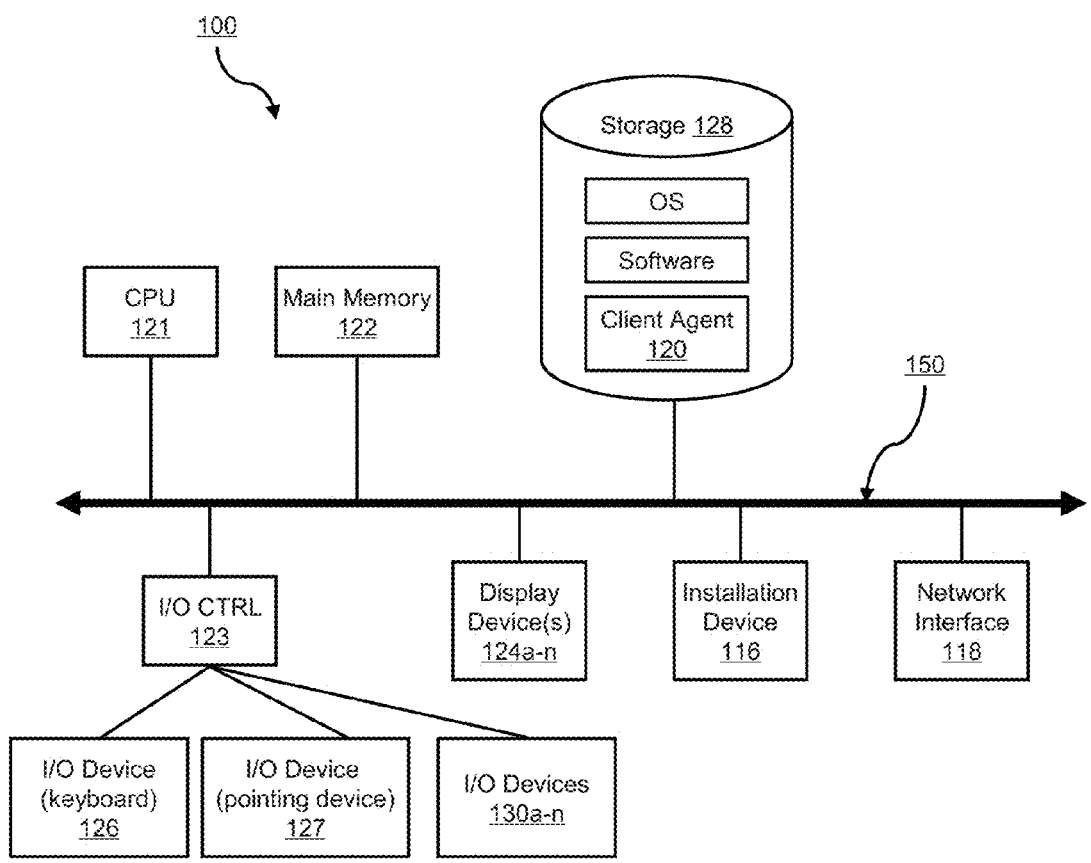
FIG. 1B and FIG. 1C are block diagrams that illustrate embodiments of computing devices according to one or more aspects described herein.

Illustrated in FIG. 1B is an embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a central processing unit 121; a main memory 122; storage memory 128; an input/output (I/O) controller 123; display devices 124A-124N; an installation device 116; and a network interface 118. In one embodiment, the storage memory 128 includes: an operating system, software routines, and a client agent 120. The I/O controller 123, in some embodiments, is further connected to a key board 126, and a pointing device 127. Other embodiments may include an I/O controller 123 connected to more than one input/output device 130A-130N.

Figure 1C:
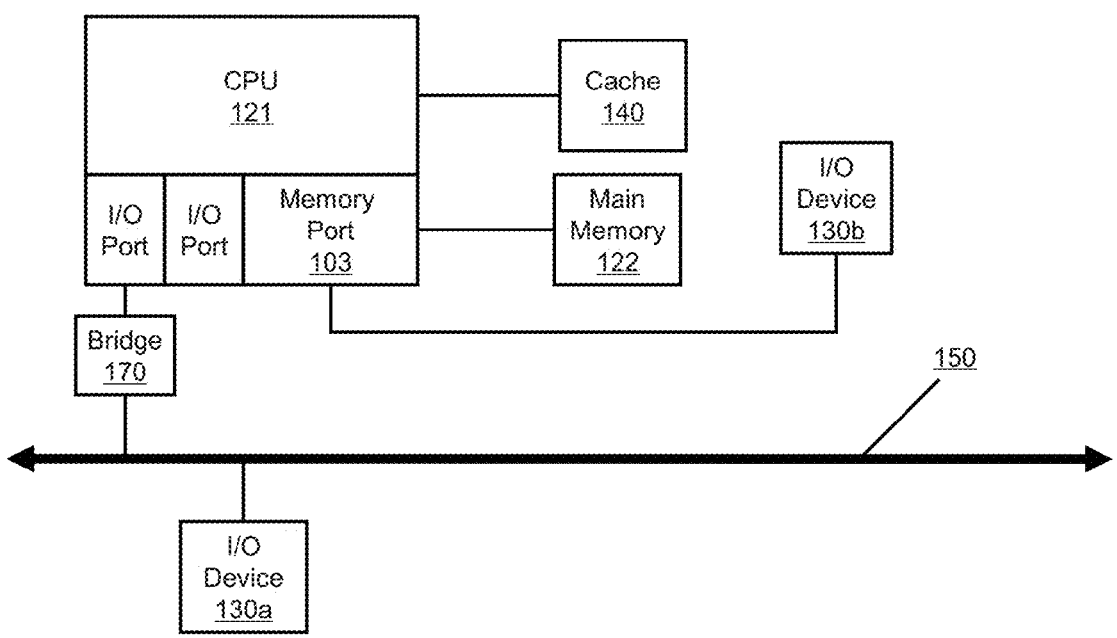

FIG. 1C illustrates one embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a bridge 170, and a first I/O device 130A. In another embodiment, the bridge 170 is in further communication with the main central processing unit 121, where the central processing unit 121 can further communicate with a second I/O device 130B, a main memory 122, and a cache memory 140. Included within the central processing unit 121, are I/O ports, a memory port 103, and a main processor.

Embodiments of the computing machine 100 can include a central processing unit 121 characterized by any one of the following component configurations: logic circuits that respond to and process instructions fetched from the main memory unit 122; a microprocessor unit, such as: those manufactured by Intel Corporation; those manufactured by Motorola Corporation; those manufactured by Transmeta Corporation of Santa Clara, Calif.; the RS/6000 processor such as those manufactured by International Business Machines; a processor such as those manufactured by Advanced Micro Devices; or any other combination of logic circuits. Still other embodiments of the central processing unit 122 may include any combination of the following: a microprocessor, a microcontroller, a central processing unit with a single processing core, a central processing unit with two processing cores, or a central processing unit with more than one processing core.

While FIG. 1C illustrates a computing device 100 that includes a single central processing unit 121, in some embodiments the computing device 100 can include one or more processing units 121. In these embodiments, the computing device 100 may store and execute firmware or other executable instructions that, when executed, direct the one or more processing units 121 to simultaneously execute instructions or to simultaneously execute instructions on a single piece of data. In other embodiments, the computing device 100 may store and execute firmware or other executable instructions that, when executed, direct the one or more processing units to each execute a section of a group of instructions. For example, each processing unit 121 may be instructed to execute a portion of a program or a particular module within a program.

In some embodiments, the processing unit 121 can include one or more processing cores. For example, the processing unit 121 may have two cores, four cores, eight cores, etc. In one embodiment, the processing unit 121 may comprise one or more parallel processing cores. The processing cores of the processing unit 121, may in some embodiments access available memory as a global address space, or in other embodiments, memory within the computing device 100 can be segmented and assigned to a particular core within the processing unit 121. In one embodiment, the one or more processing cores or processors in the computing device 100 can each access local memory. In still another embodiment, memory within the computing device 100 can be shared amongst one or more processors or processing cores, while other memory can be accessed by particular processors or subsets of processors. In embodiments where the computing device 100 includes more than one processing unit, the multiple processing units can be included in a single integrated circuit (IC). These multiple processors, in some embodiments, can be linked together by an internal high speed bus, which may be referred to as an element interconnect bus.

In embodiments where the computing device 100 includes one or more processing units 121, or a processing unit 121 including one or more processing cores, the processors can execute a single instruction simultaneously on multiple pieces of data (SIMD), or in other embodiments can execute multiple instructions simultaneously on multiple pieces of data (MIMD). In some embodiments, the computing device 100 can include any number of SIMD and MIMD processors.

The computing device 100, in some embodiments, can include a graphics processor or a graphics-processing unit (Not Shown). The graphics processing unit can include any combination of software and hardware, and can further input graphics data and graphics instructions, render a graphic from the inputted data and instructions, and output the rendered graphic. In some embodiments, the graphics processing unit can be included within the processing unit 121. In other embodiments, the computing device 100 can include one or more processing units 121, where at least one processing unit 121 is dedicated to processing and rendering graphics.

One embodiment of the computing machine 100 includes a central processing unit 121 that communicates with cache memory 140 via a secondary bus also known as a backside bus, while another embodiment of the computing machine 100 includes a central processing unit 121 that communicates with cache memory via the system bus 150. The local system bus 150 can, in some embodiments, also be used by the central processing unit to communicate with more than one type of I/O device 130A-130N. In some embodiments, the local system bus 150 can be any one of the following types of buses: a VESA VL bus; an ISA bus; an EISA bus; a MicroChannel Architecture (MCA) bus; a PCI bus; a PCI-X bus; a PCI-Express bus; an AGP bus; or a NuBus. Other embodiments of the computing machine 100 include an I/O device 130A-130N that is a video display 124 that communicates with the central processing unit 121. Still other versions of the computing machine 100 include a processor 121 connected to an I/O device 130A-130N via any one of the following connections: HyperTransport, Rapid I/O, or InfiniBand. Further embodiments of the computing machine 100 include a processor 121 that communicates with one I/O device 130A using a local interconnect bus and a second I/O device 130B using a direct connection.

The computing device 100, in some embodiments, includes a main memory unit 122 and cache memory 140. The cache memory 140 can be any memory type, and in some embodiments can be any one of the following types of memory: SRAM; BSRAM; or EDRAM. Other embodiments include cache memory 140 and a main memory unit 122 that can be any one of the following types of memory: Static random access memory (SRAM), Burst SRAM or SynchBurst SRAM (BSRAM); Dynamic random access memory (DRAM); Fast Page Mode DRAM (FPM DRAM); Enhanced DRAM (EDRAM), Extended Data Output RAM (EDO RAM); Extended Data Output DRAM (EDO DRAM); Burst Extended Data Output DRAM (BEDO DRAM); Enhanced DRAM (EDRAM); synchronous DRAM (SDRAM); JEDEC SRAM; PC100 SDRAM; Double Data Rate SDRAM (DDR SDRAM); Enhanced SDRAM (ESDRAM); SyncLink DRAM (SLDRAM); Direct Rambus DRAM (DRDRAM); Ferroelectric RAM (FRAM); Memristor based memory; or any other type of memory. Further embodiments include a central processing unit 121 that can access the main memory 122 via: a system bus 150; a memory port 103; or any other connection, bus or port that allows the processor 121 to access memory 122.

One embodiment of the computing device 100 provides support for any one of the following installation devices 116: a CD-ROM drive, a CD-R/RW drive, a DVD-ROM drive, tape drives of various formats, a USB device, Secure Digital card, NetBoot or iPXE firmware, a bootable medium, a bootable CD, a bootable CD for GNU/Linux distribution such as KNOPPIX®, a hard-drive or any other device suitable for installing applications or software. Applications can in some embodiments include a client agent 120, or any portion of a client agent 120. The computing device 100 may further include a storage device 128 that can be either one or more hard disk drives, or one or more redundant arrays of independent disks; where the storage device is configured to store an operating system, software, programs applications, or at least a portion of the client agent 120. A further embodiment of the computing device 100 includes an installation device 116 that is used as the storage device 128.

The computing device 100 may further include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56kb, X.25, SNA, DECNET), broadband connections (e.g., ISDN, Frame Relay, ATM, Gigabit Ethernet, Ethernet-over-SONET), wireless connections, or some combination of any or all of the above. Connections can also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). One version of the computing device 100 includes a network interface 118 able to communicate with additional computing devices 100' via any type and/or form of gateway or tunneling protocol such as Secure Socket Layer (SSL) or Transport Layer Security (TLS), or the Citrix Gateway Protocol manufactured by Citrix Systems, Inc. Versions of the network interface 118 can comprise any one of: a built-in network adapter; a network interface card; a PCMCIA network card; a card bus network adapter; a wireless network adapter; a USB network adapter; a modem; or any other device suitable for interfacing the computing device 100 to a network capable of communicating and performing the methods and systems described herein.

Embodiments of the computing device 100 include any one of the following I/O devices 130A-130N: a keyboard 126; a pointing device 127; mice; trackpads; an optical pen; trackballs; microphones; drawing tablets; video displays; speakers; inkjet printers; laser printers; and dye-sublimation printers; or any other input/output device able to perform the methods and systems described herein. An I/O controller 123 may in some embodiments connect to multiple I/O devices 103A-130N to control the one or more I/O devices. Some embodiments of the I/O devices 130A-130N may be configured to provide storage or an installation medium 116, while others may provide a universal serial bus (USB) interface for receiving USB storage devices such as the USB Flash Drive line of devices manufactured by Twintech Industry, Inc. Still other embodiments include an I/O device 130 that may be a bridge between the system bus 150 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a FibreChannel bus; or a Serial Attached small computer system interface bus.

In some embodiments, the computing machine 100 can connect to multiple display devices 124A-124N, in other embodiments the computing device 100 can connect to a single display device 124, while in still other embodiments the computing device 100 connects to display devices 124A-124N that are the same type or form of display, or to display devices that are different types or forms. Embodiments of the display devices 124A-124N can be supported and enabled by the following: one or multiple I/O devices 130A-130N; the I/O controller 123; a combination of I/O device(s) 130A-130N and the I/O controller 123; any combination of hardware and software able to support a display device 124A-124N; any type and/or form of video adapter, video card, driver, and/or library to interface, communicate, connect or otherwise use the display devices 124A-124N. The computing device 100 may in some embodiments be configured to use one or multiple display devices 124A-124N, these configurations include: having multiple connectors to interface to multiple display devices 124A-124N; having multiple video adapters, with each video adapter connected to one or more of the display devices 124A-124N; having an operating system configured to support multiple displays 124A-124N; using circuits and software included within the computing device 100 to connect to and use multiple display devices 124A-124N; and executing software on the main computing device 100 and multiple secondary computing devices to enable the main computing device 100 to use a secondary computing device's display as a display device 124A-124N for the main computing device 100. Still other embodiments of the computing device 100 may include multiple display devices 124A-124N provided by multiple secondary computing devices and connected to the main computing device 100 via a network.

In some embodiments, the computing machine 100 can execute any operating system, while in other embodiments the computing machine 100 can execute any of the following operating systems: versions of the MICROSOFT WINDOWS operating systems such as WINDOWS 3.x; WINDOWS 95; WINDOWS 98; WINDOWS 2000; WINDOWS NT 3.51; WINDOWS NT 4.0; WINDOWS CE; WINDOWS XP; and WINDOWS VISTA; the different releases of the Unix and Linux operating systems; any version of the MAC OS manufactured by Apple Computer; OS/2, manufactured by International Business Machines; any embedded operating system; any real-time operating system; any open source operating system; any proprietary operating system; any operating systems for mobile computing devices; or any other operating system. In still another embodiment, the computing machine 100 can execute multiple operating systems. For example, the computing machine 100 can execute PARALLELS or another virtualization platform that can execute or manage a virtual machine executing a first operating system, while the computing machine 100 executes a second operating system different from the first operating system.

The computing machine 100 can be embodied in any one of the following computing devices: a computing workstation; a desktop computer; a laptop or notebook computer; a server; a handheld computer; a mobile telephone; a portable telecommunication device; a media playing device; a gaming system; a mobile computing device; a netbook; a device of the IPOD family of devices manufactured by Apple Computer; any one of the PLAYSTATION family of devices manufactured by the Sony Corporation; any one of the Nintendo family of devices manufactured by Nintendo Co; any one of the XBOX family of devices manufactured by the Microsoft Corporation; or any other type and/or form of computing, telecommunications or media device that is capable of communication and that has sufficient processor power and memory capacity to perform the methods and systems described herein. In other embodiments the computing machine 100 can be a mobile device such as any one of the following mobile devices: a JAVA-enabled cellular telephone or personal digital assistant (PDA), such as the i55sr, i58sr, i85s, i88s, i90c, i95c1, or the im1100, all of which are manufactured by Motorola Corp; the 6035 or the 7135, manufactured by Kyocera; the i300 or i330, manufactured by Samsung Electronics Co., Ltd; the TREO 180, 270, 600, 650, 680, 700p, 700w, or 750 smart phone manufactured by Palm, Inc; any computing device that has different processors, operating systems, and input devices consistent with the device; or any other mobile computing device capable of performing the methods and systems described herein. In still other embodiments, the computing device 100 can be any one of the following mobile computing devices: any one series of Blackberry, or other handheld device manufactured by Research In Motion Limited; the iPhone manufactured by Apple Computer; Palm Pre; a Pocket PC; a Pocket PC Phone; or any other handheld mobile device.

In some embodiments, the computing device 100 may have different processors, operating systems, and input devices consistent with the device. For example, in one embodiment, the computing device 100 is a TREO 180, 270, 600, 650, 680, 700p, 700w, or 750 smart phone manufactured by Palm, Inc. In some of these embodiments, the TREO smart phone is operated under the control of the PalmOS operating system and includes a stylus input device as well as a five-way navigator device.

In other embodiments the computing device 100 is a mobile device, such as a JAVA-enabled cellular telephone or personal digital assistant (PDA), such as the i55sr, i58sr, i85s, i88s, i90c, i95c1, or the im1100, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea. In some embodiments, the computing device 100 is a mobile device manufactured by Nokia of Finland, or by Sony Ericsson Mobile Communications AB of Lund, Sweden.

In still other embodiments, the computing device 100 is a Blackberry handheld or smart phone, such as the devices manufactured by Research In Motion Limited, including the Blackberry 7100 series, 8700 series, 7700 series, 7200 series, the Blackberry 7520, or the Blackberry Pearl 8100. In yet other embodiments, the computing device 100 is a smart phone, Pocket PC, Pocket PC Phone, or other handheld mobile device supporting Microsoft Windows Mobile Software. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, the computing device 100 is a digital audio player. In one of these embodiments, the computing device 100 is a digital audio player such as the Apple IPOD, IPOD Touch, IPOD NANO, and IPOD SHUFFLE lines of devices, manufactured by Apple Computer of Cupertino, Calif. In another of these embodiments, the digital audio player may function as both a portable media player and as a mass storage device. In other embodiments, the computing device 100 is a digital audio player such as the DigitalAudioPlayer Select MP3 players, manufactured by Samsung Electronics America, of Ridgefield Park, N.J., or the Motorola m500 or m25 Digital Audio Players, manufactured by Motorola Inc. of Schaumburg, Ill. In still other embodiments, the computing device 100 is a portable media player, such as the Zen Vision W, the Zen Vision series, the Zen Portable Media Center devices, or the Digital MP3 line of MP3 players, manufactured by Creative Technologies Ltd. In yet other embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 comprises a combination of devices, such as a mobile phone combined with a digital audio player or portable media player. In one of these embodiments, the computing device 100 is a Motorola RAZR or Motorola ROKR line of combination digital audio players and mobile phones. In another of these embodiments, the computing device 100 is an iPhone smartphone, manufactured by Apple Computer of Cupertino, Calif.

FIGS. 1A-1C are illustrative in nature, and the specific identification of one or more hardware and/or software vendors, devices, services, and other examples are non-limiting. As newer versions of each respective service or device is developed, such new version may also or instead be used, as well as other new services and devices not listed herein.

Section B: Systems for Providing Shell Integration for an Application Executing Remotely on a Server Referring to FIG. 2, a block diagram illustrating an illustrative system 200 for providing shell integration for an application executing remotely on a server is shown and described. In brief overview, the system 200 includes a server 106. A server agent 210 executing on the server 106 communicates with a hosted application 220 executing on the server 106. In some embodiments, the hosted application 220 executes within a newly created user session. In some embodiments, the hosted application 220 executes within an existing user session. The server agent 210 communicates over a network 104 with a client agent 230. In some embodiments, the server agent 210 communicates with the client agent 230 over a remote presentation layer protocol, such as those described herein. The client agent 230 executes on a client computing device 102 and may communicate with the Shell 240 of the operating system of the client device 102. The shell 240 may communicate with a local process 250.

In some embodiments a process executing on a server generates output data and window attribute data. The output data and window attribute data is transmitted by the server agent 210 to a client agent 230. In some embodiments, the process may also be referred to as a remote application 220 or a hosted application 220. In other embodiments, the local process executing on a client computing device 102 receives the output or graphical data and window attribute data from the client agent 230 and directs the display of the received graphical or window attribute data in a desktop environment. In some embodiments, a shell 240 executing on a client device 102 provides a display of user interface elements in a desktop environment. This shell may be referred to variously as a finder, a graphical user interface (GUI), a window or X-windows interface, or any other similar term. In some embodiments, the shell 240 displays graphical data associated with the remote application 220 in accordance with the attribute data associated with the application 220.

Figure 2:
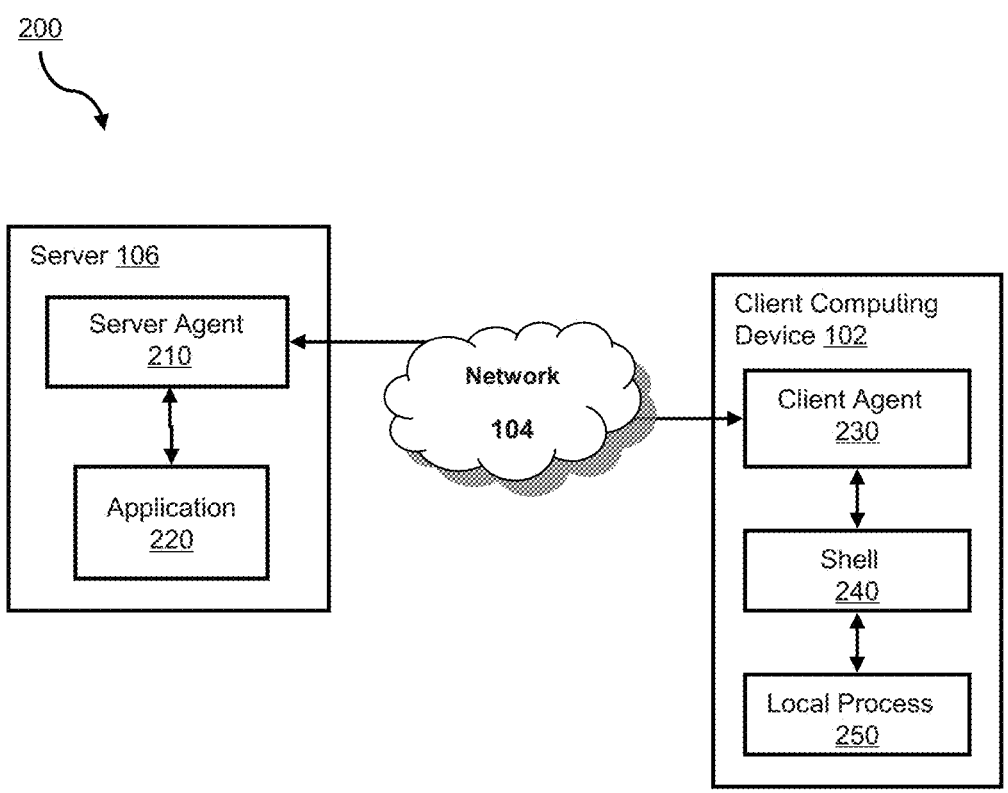
FIG. 2 is a block diagram illustrating an exemplary system for providing shell integration for an application executing remotely on a server according to one or more aspects described herein.

Still referring to FIG. 2, and in greater detail, the client agent 230 executes on the local computing device 102. Although referred to as a client agent, in some embodiments, client agent 230 may be referred to as a receiver, local client, local client process, local client agent, or any other similar term. In one embodiment, the local computing device is a computing device as described in connection with FIGS. 1A-1C. In another embodiment, the local computing device is a client device 102, connecting to a server 106 to access one or more resources available to a user of the local computing device 102. In still another embodiment, the client agent 230 is part of a presentation layer protocol agent. In another embodiment, the client agent 230 is in communication with a presentation layer protocol agent. In various embodiments, the client agent may comprise software, hardware or any combination of hardware and software.

The server agent 210 executes on the remote computing device 106. As with the client agent 230, in some embodiments, the server agent may be referred to as a remote agent, a remote client, a remote process, a server process, or any other similar term. In one embodiment, the remote computing device is a computing device as described in connection FIGS. 1A-1C. In another embodiment, the server agent 210 is part of a presentation layer protocol agent. In still another embodiment, the server agent 210 is in communication with a presentation layer protocol agent. In various embodiments, the server agent may comprise software, hardware or any combination of hardware and software.

In some embodiments, the client agent 230 includes a receiver (e.g., a virtual machine receiver) for receiving, from the server agent 210, data associated with a desktop environment generated on the remote machine 106. In one of these embodiments, for example, the client agent 230 includes a receiver—which may be provided as, by way of example, a dynamically linked library (.dll) component—that receives window creation and window process data from the server agent 210 for use in displaying a local version of a window generated on the remote machine 106. In some embodiments, the client agent 230 may receive data, such as output data and window attribute data over one or more connections. In one embodiment, one or more connections may be multiplexed into one or more virtual channels. Such multiplexing may allow for different virtual channels to have different bandwidth limits or different priorities, while still being part of a single transport layer connection. This may reduce the transport layer overhead required and provide for SSL or VPN tunnel capability, while still allowing per-channel compression, buffering, and management of communication priority between server agent 210 and client agent 230. In some embodiments, such virtual channels may be dedicated to specific content types or purposes. For example, a first high-priority virtual channel may be dedicated to transmission of output data, while a second low-priority virtual channel may be dedicated to transmission of taskbar thumbnail images, discussed in more detail below. In some embodiments, virtual channels may be opened or closed without needing to disestablish or reestablish the transport layer connection over which they communicate.

In one embodiment, the shell 240 is software providing a user interface to the user of a computing device. In one embodiment, a shell 240 may be supplemented or replaced with a third-party shell. In MICROSOFT WINDOWS, the default shell is EXPLORER, which determines the configuration of the desktop (e.g., the task bar, notification area, start menu, etc.). Although referred to as a shell, as discussed above, the shell may also be referred to as a GUI, a finder, an explorer, a windows interface, or any other similar term.

In some embodiments, the client agent 230 includes functionality for communicating with the shell 240 to modify a display of the desktop. In one of these embodiments, the client agent 230 includes a transmitter sending instructions to a component in the operating system that generates and maintains a display of data in the desktop environment. In another of these embodiments, the client agent 230 includes a component that provides the client agent 230 with functionality for storing window attribute data or transmitting display instructions to the operating system; for example, the client agent 230 may include a dynamically-linked library component for maintaining or modifying taskbar data. In some embodiments, the transmitter is in communication with a receiver in the client agent 230 that receives window attribute data and output data from the server agent 210. In one of these embodiments, the receiver within the client agent 230 receives data from the server agent 210 and forwards the received data to the transmitter, which sends instructions to the operating system based upon the forwarded data. In other embodiments, the client agent 230 includes a component for storing data received from the server agent 210, such as, by way of example, window attribute data.

In some embodiments, the client agent 230 transmits to the server agent 210 data from the interaction of the user with a destination list. In some embodiments, the user clicks on a Shell Item or Shell Link in the destination list. The client agent 230 receives the user interaction with the list and transmits the data to the server agent 210. The server agent 210 communicates with the hosted application 220. The hosted application 220 receives the information and processes the information. In some embodiments, the hosted application 220, responsive to the user interaction, may open a document requested by the user. In some embodiments, the hosted application 220 may launch a second application responsive to the user interaction.

Figure 3:
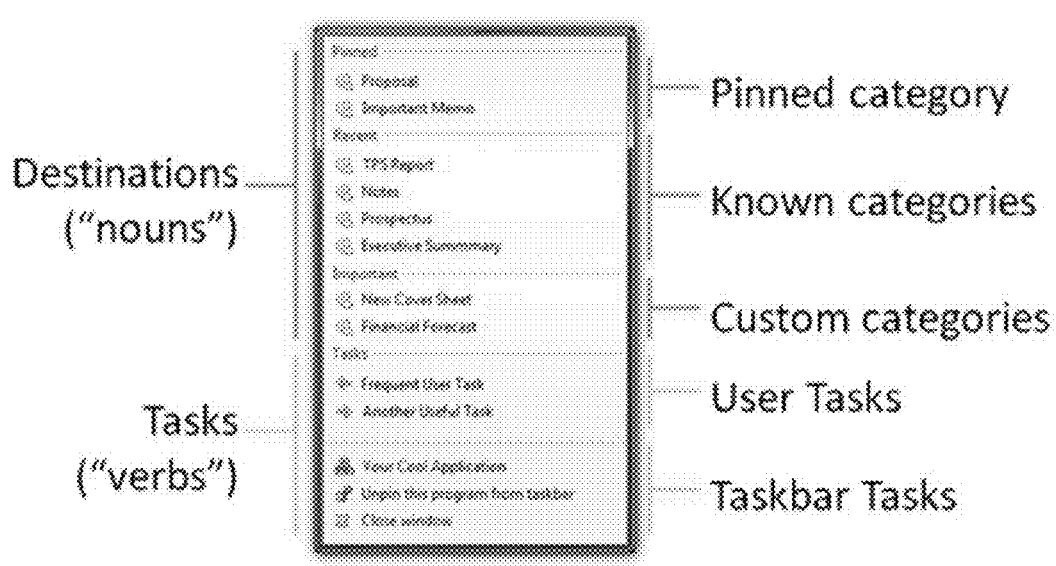
FIG. 3 is a screenshot of one embodiment of a Jump List or Destination List according to one or more aspects described herein.

With reference to FIG. 3, a screen shot of one embodiment of a Jump List or Destination List is shown. Destination lists provide quick and easy access to common application tasks or content. Destination lists provide the means or mechanism to launch a new instance of an application, to pin or unpin an application to the taskbar, and to close the application. A user can access the Jump List, e.g., by right clicking on an application icon in the Taskbar. FIG. 3 illustrates a customized Jump List. By default, a Jump List contains a Recent category that is populated automatically for file-based applications through the SHAddToRecentDocs function. This function adds the used "item" (document) to the Shell's 240 list of recently used documents. In addition to updating its list of recent documents, the Shell 240 adds a shortcut to the user's Recent directory. The operating system Taskbar uses that list and Recent directory to populate the list of recent items in the Jump Lists. The Shell 240 does the work automatically on behalf of the application, if the application's file type has a registered handler (this does not have to be the default handler). Anytime a user double-clicks on a file type with a registered handler, before the OS launches the application it may automatically call SHAddToRecentDocs on behalf of the application, which inserts the item in the Recent list and eventually into the Jump List Recent Category. The same automatic behavior may occur when using the OS common file dialog to open files through applications. The OS may automatically insert items into the Jump Lists unless the application specifically removes this functionality. Users may also have the option to remove any item from their Jump List(s). By explicitly removing an item from the Jump List, it is inserted it into the Removed Item list.

Figure 4:
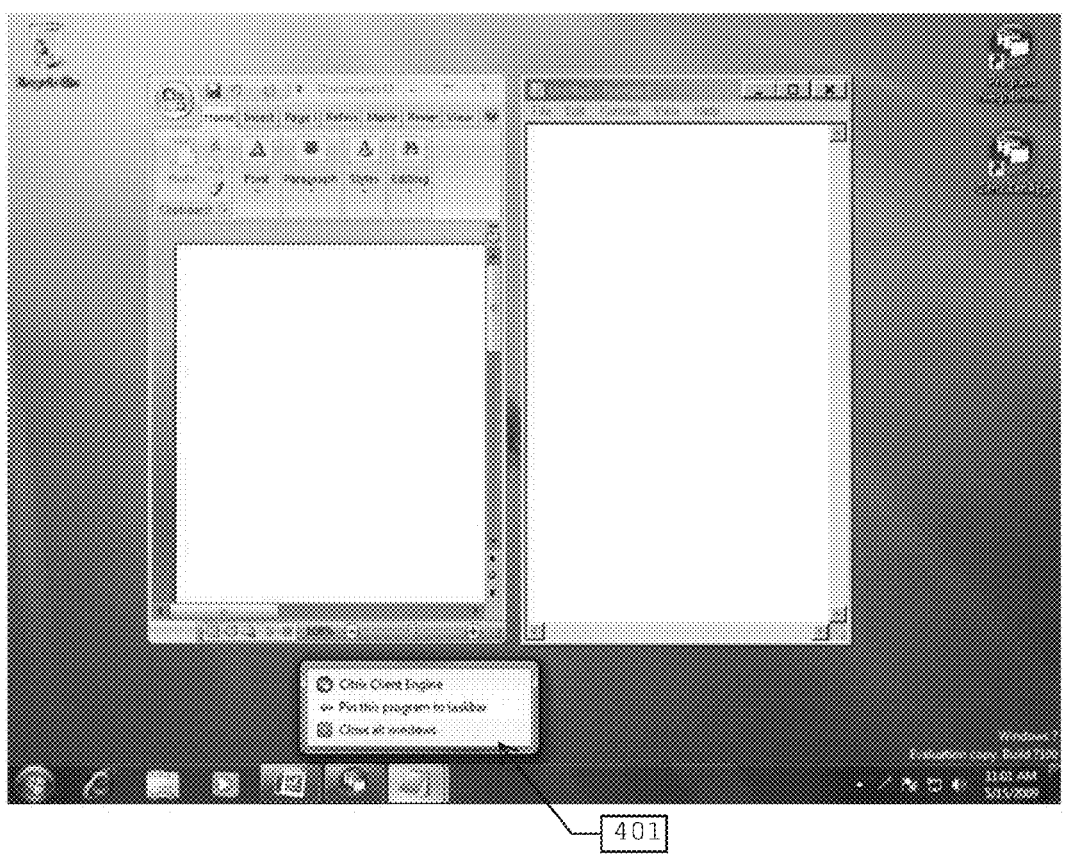
FIG. 4 is a screenshot of a default Destination List for a remotely executing application according to one or more aspects described herein.
Figure 5:
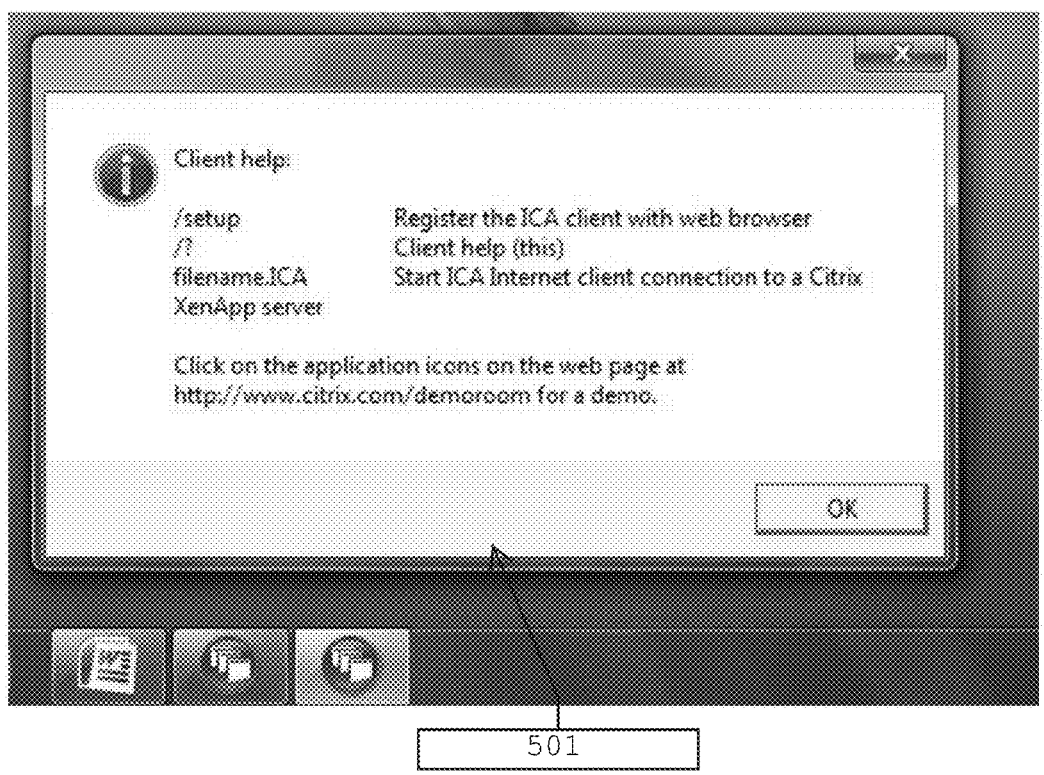
FIG. 5 is a screenshot of an error dialog box displayed when an error occurs when launching a pinned presentation layer protocol engine without context according to one or more aspects described herein.
Figure 6:
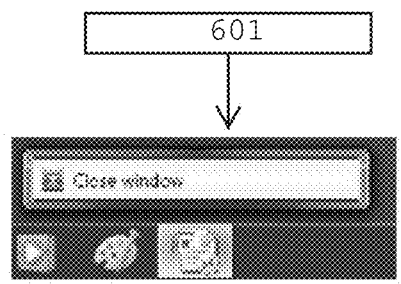
FIG. 6 is a screenshot of a very limited Destination List for remotely executing application with only a "Close Window" option according to one or more aspects described herein.
Figure 7:
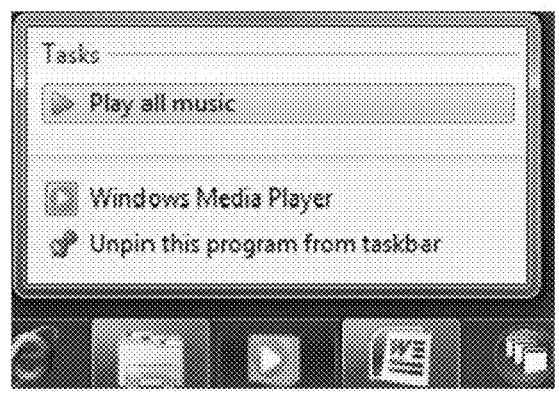
FIG. 7 is a screenshot of a pinned media player according to one or more aspects described herein.

Referring to FIGS. 4-6, illustrated in the figures are screenshots of prior art which demonstrate issues with the behavior of remote applications without the benefit of shell integration. Now referring to FIG. 4, a screen shot of a default Destination List 401 for a remotely executing application 220 is shown. For remotely executed applications 220, a default Jump List is created for each instance of the presentation layer protocol engine and the name of the presentation layer protocol Icon and "HDX Plugin" (or "Client Engine" depending on client version) name shows up in the list. The application 220 can be pinned but an attempt to launch later, of course, results in an error because the presentation layer protocol engine is not provided with input parameters. FIG. 5 illustrates an error dialog box 501 displayed when an error occurs when launching a pinned presentation layer protocol engine without context. FIG. 6 illustrates a screen shot 601 of a very limited Destination List for remotely executing application 220 with only a "Close Window" option. FIG. 7 illustrates a screen shot of a pinned media player.

Figure 8:
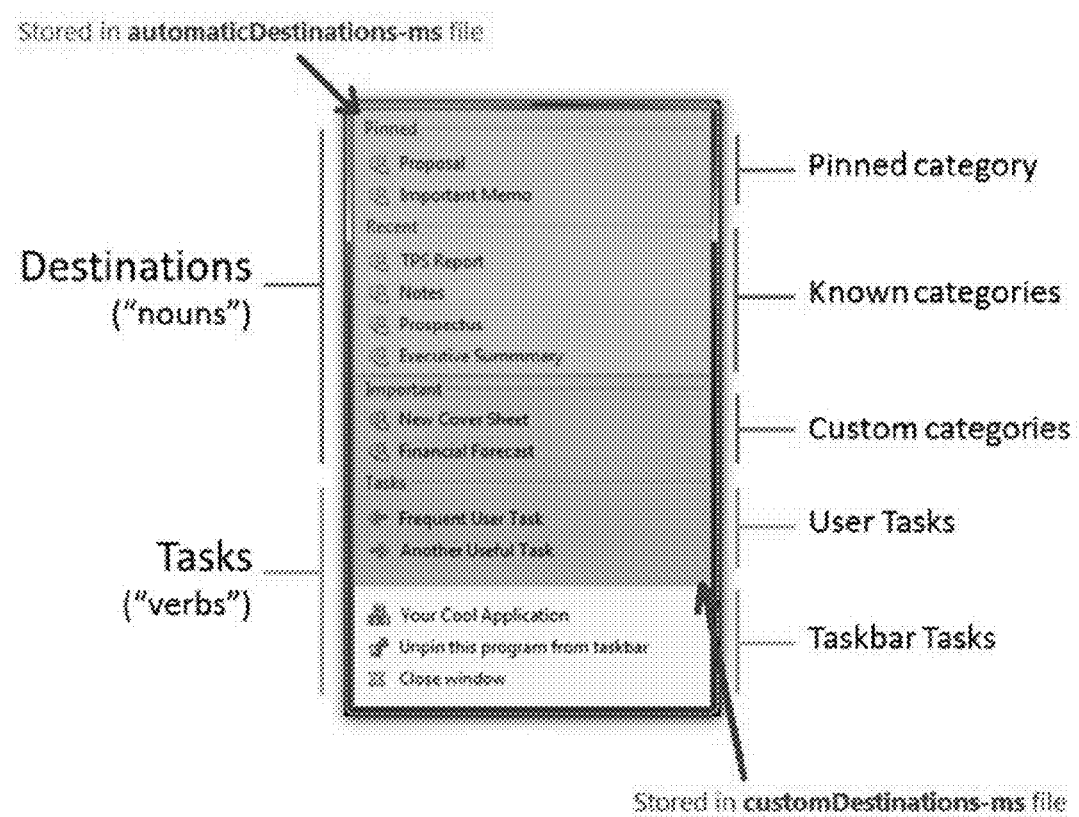
FIG. 8 illustrates a screenshot of storage for automatic and custom destinations according to one or more aspects described herein.

FIG. 8 illustrates a screen shot of storage for automatic and custom destinations. For instance, the destinations, such as pinned category and known categories, may be stored in an automaticDestinations-ms file while tasks, such as custom categories and user task may be stored in a customDestinations-ms file. A Destination List file is versioned and consists of an array (Categories) of arrays (Shell Items and Shell Links). In some embodiments, all numerical values are in decimal format unless otherwise indicated.

The following table 1 illustrates the format of the outermost structure that may be used to encapsulate the entire custom Destination List file.

TABLE 1

| File Offset | Size of field (bytes) | Value(s) | Notes |
|---|---|---|---|
| 0 | 4 | 2 | Version of the file format. Current version is "2.0". |
| 4 | 4 | ≥0 | Count of all Destination Category instances in the file. The type and payload of each Destination Category is defined below. |
| 8 | 4 | 0 | Unused/reserved. |
| 12 | rest of file | varies | Array of one or more Destination Category instances. |

The following table 2 illustrates the format of each Destination Category instance contained in the Destination List file. The Destination Category instances are usually persisted in the file in the order of the numerical value (i.e. Custom Categories, then Known Categories instance, and finally the Custom Tasks Category instance.)

TABLE 2

| File Offset | Size of field (bytes) | Value(s) | Notes |
|---|---|---|---|
| ≥12 | 4 | 0, 1, 2 | Specifies the Destination Category Type of this instance. Valid types: 0: Custom Category Type - A collection of custom destinations. 1: Known Category Type - A collection of known destinations, e.g., Recent or Frequent documents. 2: Custom Tasks Category Type - A collection of custom tasks. |
| ≥16 | varies | varies | Payload. The structure depends on the type specified above. Refer to the following tables. |

TABLE 3

Destination Category Type 0 (Custom Category) Payload

| File Offset | Size of field (bytes) | Value(s) | Notes |
|---|---|---|---|
| ≥16 | varies | [Title] | Custom Category Title as a BSTR UNICODE string (Byte Count followed by String). This is the label of the Custom Category as shown in the Destination List. |
| Varies | 4 | Count of items | Number of destinations (Shell Items or Shell Links) in the category. |
| Varies | ≥16, varies | varies | Array of destinations: Refer to the Shell Objects (Shell Item or Shell Link) table. |
| Varies | 4 | 0xBABFFBAB | Category Signature. Delimiter constant which terminates each Destination Category section in the file. |

TABLE 4

Destination Category Type 1 (Known Category) Payload

| File Offset | Size of field (bytes) | Value(s) | Notes |
|---|---|---|---|
| varies | 4 | Count of items | Number of destinations (Shell Items or Shell Links) in the category. |
| Varies | ≥16, varies | varies | Array of destinations: Refer to the Shell Objects (Shell Item or Shell Link) table. |
| Varies | 4 | 0xBABFFBAB | Category Signature. Delimiter constant which terminates each Destination Category section in the file. |

TABLE 5

Destination Category Type 2 (Custom Tasks Category) Payload

| File Offset | Size of field (bytes) | Value(s) | Notes |
|---|---|---|---|
| varies | 4 | Count of items | Number of destinations (Shell Links in this case) in the category. |
| Varies | ≥16, varies | varies | Array of destinations: Refer to the Shell Objects (Shell Item or Shell Link) table. The array in this special category is of Shell Links only. |
| varies | 4 | 0xBABFFBAB | Category Signature. Delimiter constant which terminates each Destination Category section in the file. |

TABLE 6

Shell Objects (Shell Item or Shell Link)

| File Offset | Size of field (bytes) | Value(s) | Notes |
|---|---|---|---|
| ≥20 | 16 | CLSID of persisted shell object | For example, CLSID of ShellLink: 01 14 02 00 00 00 00 00 c0 00 00 00 00 00 00 46 |
| varies | Varies | varies | Persisted Shell Objects as property bag containing name-value pairs derived from IShellObject/IShellLink and including but not limited to Display Name/Label Icon Reference Path to document/content/URL Path to exe Exe name Arguments Etc. Some of the properties may not be relevant to the DL itself and to remoting over ICA/HDX, e.g., Computer Name, Creator SID, etc. They are believed to be persisted in the DL file by Microsoft simply for the convenience of dumping all properties of the Shell Object. A Shell Objects is persistent in the form of a serialized link (.LNK) file. |

Figure 9:
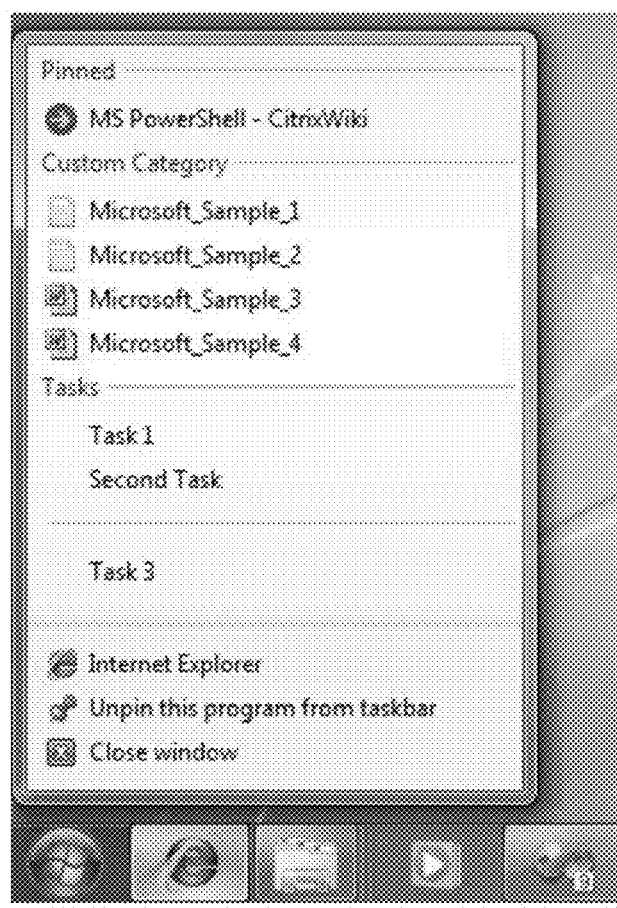
FIG. 9 illustrates a screenshot of replacing the custom Destination List of Internet Explorer 8 according to one or more aspects described herein.

FIG. 9 illustrates a screen shot of replacing the custom Destination List of Internet Explorer 8. In some embodiments, only the custom destinations are replaced. The original pinned items from the web browser's automatic Destination List file remain intact. In some embodiments, the name of the Custom Destination List file is computed as a CRC-64 of the App ID string in upper case, and the extension is .customDestinations-ms. In some embodiments, the name of the Automatic Destination List file is computed as a CRC-64 of the App ID string in upper case, and the extension is .automaticDestinations-ms. In other words, in some embodiments, the names of the corresponding Custom and Automatic Destination List files are identical but the extensions are different. In some embodiments, the Custom Destination List files are stored in the following location: %APPDATA%\Microsoft\Windows\Recent\CustomDestinations. In some embodiments, the Automatic Destination List files are stored in the following location: %APPDATA%\Microsoft\Windows\Recent\AutomaticDestinations.

Figure 10:
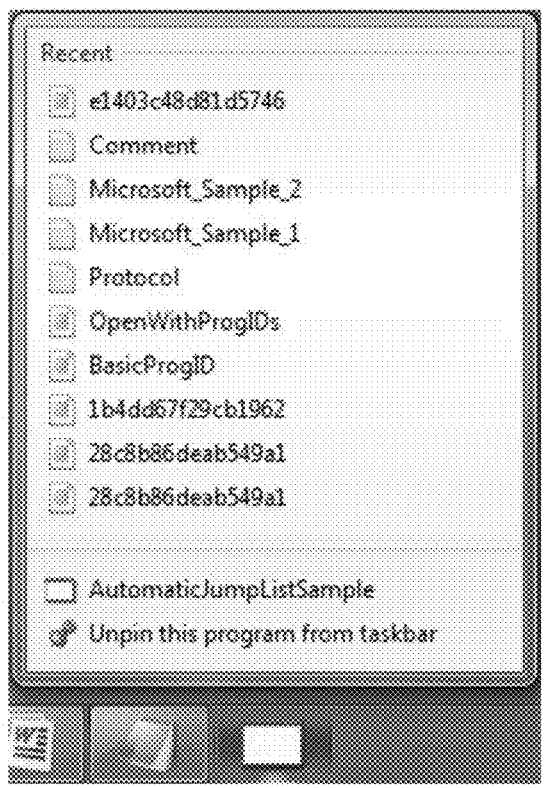
FIG. 10 is a screenshot of a custom application presenting the automatic Destination List of Notepad according to one or more aspects described herein.

FIG. 10 is a screenshot of a custom application built to present the automatic Destination List of Notepad. In some embodiments, only the automatic destinations are replaced. In some embodiments, there are multiple options in terms of End User Experience (EUX) design for remote applications. In some embodiments, the systems may keep remote applications separate from the equivalent local apps, (i.e., do not group them on the Taskbar and therefore do not share the Destination List). In some embodiments, the Destination Lists of local and remote applications of the same type (same App ID) are merged. There are also different options as to how to merge the Destination Lists. In some embodiments, the Destination Lists are shared but categories are separate. The system marks or identifies categories holding destinations or tasks accessed by or applied to the remote application 220. In some embodiments, the system shares the Destination Lists and their categories, but marks or identifies destinations or tasks accessed by or applied to the remote applications. In some embodiments, the system shares the Destination Lists and their categories and merges tasks and destinations completely and seamlessly to the user. This eliminates duplicative tasks where appropriate. In some embodiments, the Destination Lists are customized and can be ported to non-Windows platforms. For example, a custom Receiver category and a Preferences task within it, which allows the user to quickly open a configuration menu on a per application basis. For example, the user might configure drive-mapping settings, special folders, USB devices, or other security or usability settings for a specific application. In some embodiments, the default taskbar tasks can be trimmed down to a "Close Window" only option in order to prevent pinning. This may be used in cases where the remote application 220 is launched via a low-level SDK and the Citrix self-service plugin stub executables, or equivalent stub executables, are not available to represent the application on the taskbar.

Figure 11A:
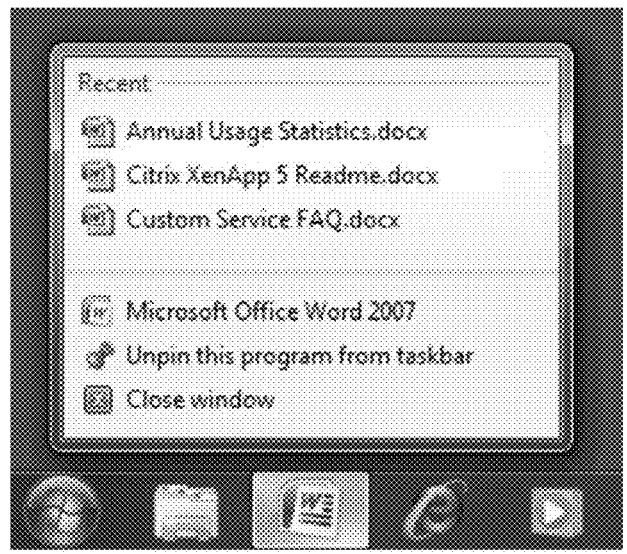
FIGS. 11A-11D illustrate visual illustrations of some of the options for Destination Lists according to one or more aspects described herein.
Figure 11B:
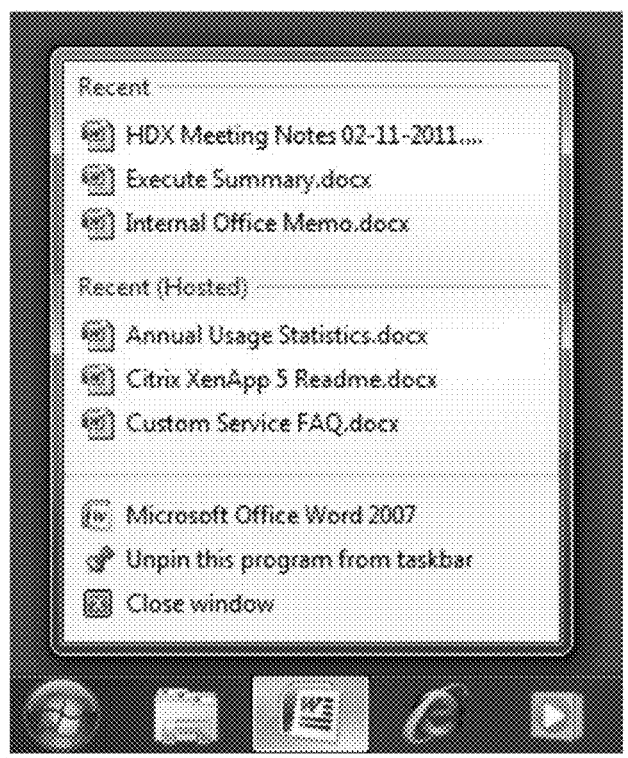
Figure 11C:
Figure 11D:
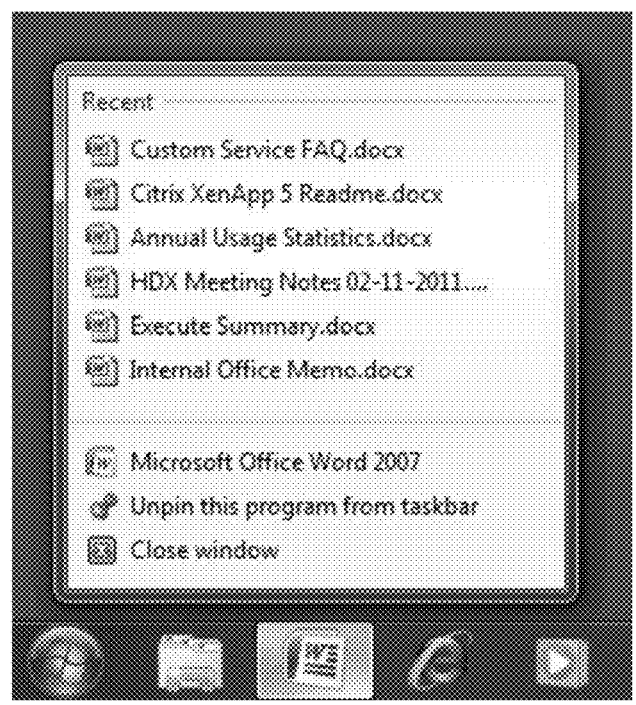

FIGS. 11A-11D illustrates visual illustrations of some of the options for Destination Lists. There could also be other options or permutations of variations not illustrated in the figures. FIG. 11A illustrates a destination list for remote application 220 not grouped with a destination list for a corresponding local application. This may be done for simplicity of Destination List handling. FIG. 11B illustrates a destination list for remote application 220 grouped with a destination list for a corresponding local application, but with separate categories. The recent category for the remote MS Word application is separate and is identified as Recent (Hosted). FIG. 11C illustrates a destination list for the remote application 220 grouped with a destination list for the corresponding local application with shared categories and marked remote application destinations. The Recent category is shared between the local and remote MS Word application. But the destinations accessed by the remote application 220 are marked with an overlay icon at the lower right corner of the application's FTA icon. FIG. 11D illustrates a destination list for the remote application 220 grouped with a destination list for the corresponding local application with shared categories and seamlessly merged destinations. In this embodiment, the user cannot tell which destinations are accessed by the local MS Word and which ones are accessed by remote MS Word (i.e., integration is completely seamless), e.g., because two distinguishable icons are not used.

Figure 12:
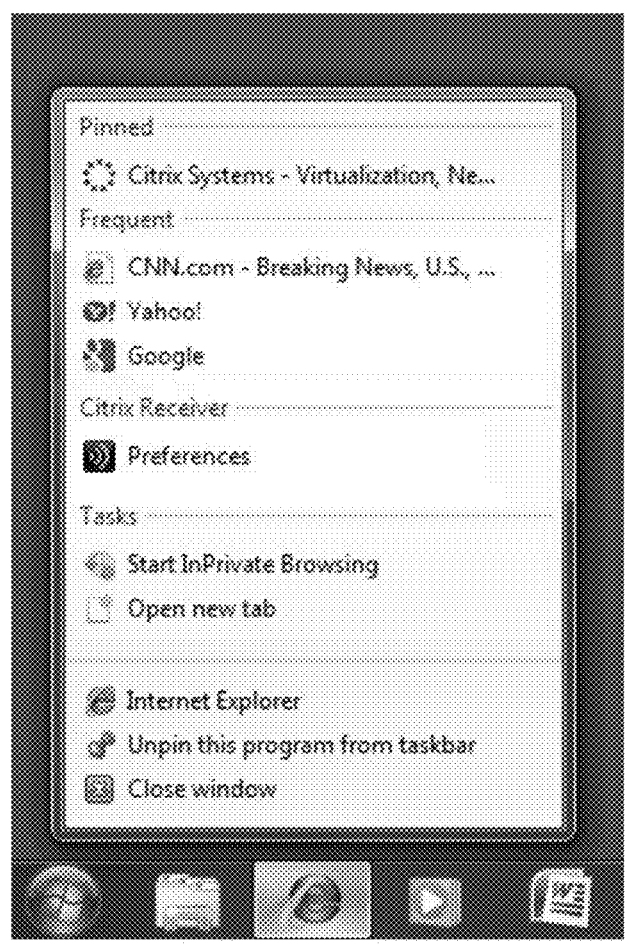
FIG. 12 illustrates a screen shot of a customized Internet Explorer 8 Destination List with a custom "Citrix Receiver" category and a "Preferences" task according to one or more aspects described herein.

FIG. 12 illustrates a screen shot of a customized Internet Explorer 8 Destination List with a Custom Citrix Receiver Category and a Preferences Task. The illustrated customization can be done consistently for all remotely executed applications.

Figure 13:
FIG. 13 illustrates a Close-Window only option to prevent pinning, although the Destination List for the application is still available according to one or more aspects described herein.

FIG. 13 illustrates a Close-Window only option to prevent pinning, although the Destination List for the application is still available. This may be done by registering the Destination List owning process as a host process. For example, to register CustomApp.exe as a host process, the following registry settings may be used:
[HKEY_CLASSES_ROOT\Applications\CustomApp.exe]
  "IsHostApp"=""

Figure 14:
FIG. 14 is a screenshot illustrating a Media Player Thumbnail Toolbar according to one or more aspects described herein.

Thumbnail Toolbars. Thumbnail toolbars provide access to a particular window's key commands without making the user restore or activate the application's window. An active toolbar control can be embedded in that window's thumbnail preview. For example, a Media Player might offer standard media transport controls such as play, pause, mute, and stop. The UI may display this toolbar directly below the thumbnail as shown in FIG. 14, even when the application is remotely hosted.

When an application displays a window, its Taskbar button is created by the system. When the button is in place, the Taskbar sends a TaskbarButtonCreated message to the window. Its value is computed by calling RegisterWindowMessage(L("TaskbarButtonCreated")). Then it is safe for the app to populate its Thumbnail Toolbar with up to 7 customizable buttons using the ITaskbarList3 interface methods.

Each button's ID, image, tooltip, and state are defined in a THUMBBUTTON structure, which is then passed to the taskbar. The app can show, enable, disable, or hide buttons from the thumbnail toolbar as required by its current state.

When a button is clicked, a WM_COMMAND message that contains the button ID is sent to the associated application window. The application handles whatever action it has assigned to the button.

Figure 15:
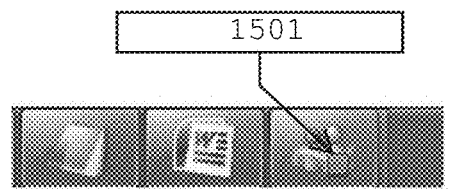
FIG. 15 illustrates an overlay icon in the context of a remotely executing application according to one or more aspects described herein.

Overlay Icons. FIG. 15 displays an overlay icon 1501 in the context of a remotely executing application 220. An application can communicate certain notifications and status to the user through its taskbar button by the display of small overlays on the button. These overlays are similar to the type of existing overlay used for shortcuts or security notifications, displayed at the lower-right corner of the button. To display an overlay icon, the taskbar must be in the default large icon mode, as shown in FIG. 15.

Icon overlays serve as a contextual notification of status, and are intended to negate the need for a separate notification area status icon to communicate that information to the user. They are intended to supply important, long-standing status or notifications such as network status, messenger status, or new mail.

Progress Bars. FIGS. 16A-D illustrate various states of the progress bars for a remotely executed application 220. A taskbar button can be used to display a progress bar. This enables a window to provide progress information to the user without that user having to switch to the window itself. The user can stay productive in another application while seeing at a glance the progress of one or more operations occurring in other windows. It is intended that a progress bar in a taskbar button reflects a more detailed progress indicator in the window itself. This feature can be used to track file copies, downloads, installations, media burning, or any operation that's going to take a period of time. This feature is not intended for use with normally peripheral actions such as the loading of a webpage or the printing of a document. That type of progress should continue to be shown in a window's status bar.

The taskbar button progress bar is a similar experience to the familiar Progress Bar control. It can display either determinate progress based on a completed percentage of the operation or an indeterminate marquee-style progress to indicate that the operation is in progress without any prediction of time remaining. It can also show that the operation is paused or has encountered an error and requires user intervention.

Figure 16A:
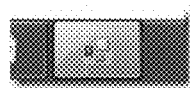
FIGS. 16A-D illustrate various states of the progress bars for a remotely executed application according to one or more aspects described herein.
Figure 16B:
Figure 16C:
Figure 16D:

FIG. 16A illustrates a progress bar state that is normal. FIG. 16B illustrates a progress bar state that is intermediate. FIG. 16C illustrates a progress bar state error. FIG. 16D illustrates a progress bar state paused. In some embodiments, the normal and intermediate states are illustrated as a different color than an error or paused progress state. For instance, in one embodiment, the normal and intermediate progress states may be displayed in green, indicating that there are no problems and the application is progressing. An error state may be displayed in red, indicating that there is an error causing the application to stop. A yellow progress state may indicate that the progress of the application is paused, but there are no problems.

Internet Explorer. Internet Explorer 9 (IE9) offers many new features not previously available, among which include a tighter integration with the Shell, including Destination Lists, Thumbnail toolbars, and Overlay icons. Regarding Destination Lists, IE 9 permits web developers to customize their web pages so as to add custom tasks and categories to the pages' HTML markup and to be included in the website's own Destination List, should the user decide to pin the site to their taskbar. IE 9 creates the necessary shortcuts (URL shortcut files of type .website) in the user's profile and generates separate App User Model IDs for these shortcuts, and services the website's custom task actions by automatically launching new instances of IE 9, as needed. Stated differently, individual web sites may have distinct destination lists from each other and from the web browser itself. IE 9 is an example of an application with advanced Shell integration functionality. The systems and methods described herein ensure that IE 9, running as a remotely executed application 220, is seamlessly integrated with the Shell 240 of the client computing device 102, such that the user cannot perceive that IE 9 and the web sites it loads are actually running on the remote server 106. Remotely executing IE 9 appears substantially indistinguishable from locally executing IE 9 in terms of Shell integration.

Figure 17:
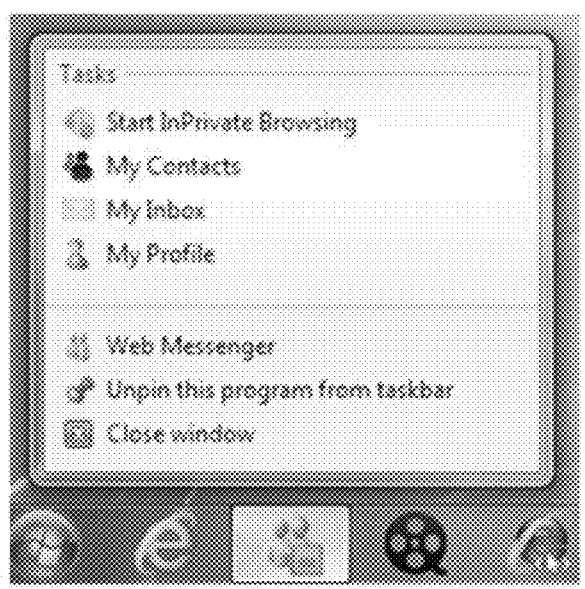
FIG. 17 illustrates a screen shot of IE 9 Destination List Tasks for a Communication site according to one or more aspects described herein.
Figure 18:
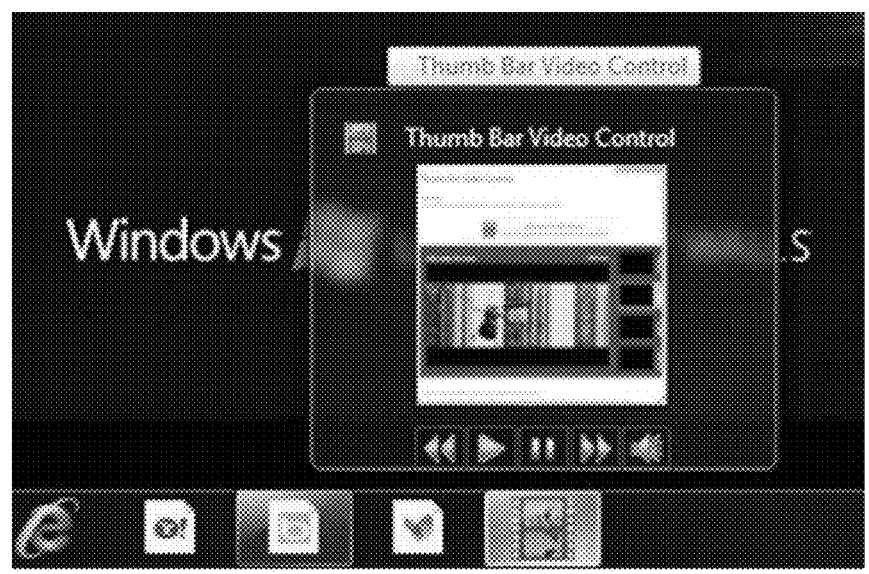
FIG. 18 illustrates a screenshot of IE 9 thumbnail tool bar buttons to control video according to one or more aspects described herein.
Figure 19:
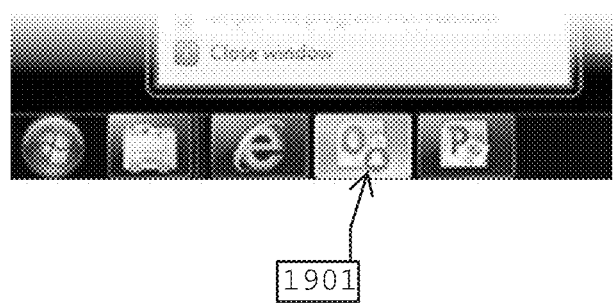
FIG. 19 illustrates a screenshot of an overlay icon in Outlook Web Access window icon indicating an appointment notification according to one or more aspects described herein.

FIG. 17 illustrates a screen shot of IE 9 Destination List Tasks for a Communication site. FIG. 18 illustrates a screenshot of IE 9 thumbnail tool bar buttons to control video. FIG. 19 illustrates a screenshot of an overlay icon 1901 in Outlook Web Access window icon indicating an appointment notification.

Figure 20:
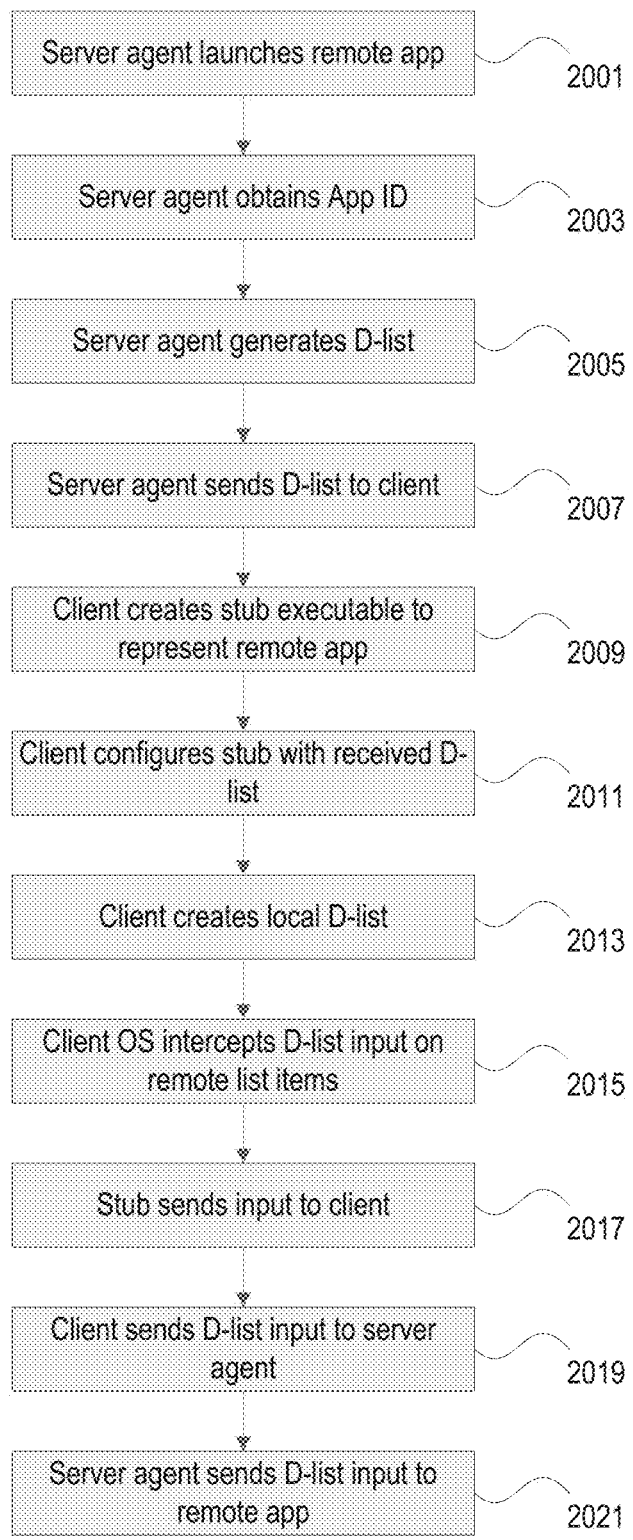
FIG. 20 illustrates a flowchart for a method of performing shell integration for destination lists according to one or more aspects described herein.

Section C: Methods for Providing Shell Integration for an Application Executing Remotely on a Server FIG. 20 illustrates a method for performing shell integration for Destination Lists for applications 220 executing remotely on a server 106. Initially, in step 2001, a server agent 210 executing on a server 106 launches an application 220 responsive to a request from a client computing device 102. In step 2003, the server agent obtains an application identifier for the application 220. For example, the server agent 210 may detect a window created by the launched application 220, and extract an application identifier from the window. In step 2005, server agent 210 generates a destination list for the application 220. For example, server agent 210 may parse a Destination List for the launched application 220 retrieved from storage, and may also detect real-time changes to the Destination List performed by the launched application 220. In step 2007, server agent 210 transmits the parsed Destination List for the launched application 220 to a client agent 230 executing on the client computing device 102. In step 2009, client agent 230 creates a stub executable (e.g., FIG. 2 local process 250) to represent the application 220 executing remotely on the server 106 using the application identifier. In step 2011, client agent 230 configures the stub executable using the received parsed Destination List. In step 2013, client agent 230 may create a local instance of the Destination List using the parsed Destination List received from the server agent 210. In step 2015, a client OS Shell executes the stub executable responsive to intercepting user input on the client computing device 102 such as user input triggering various items on the Destination List intended for the application 220. In step 2017 the stub executable transmits the user input on the Destination List to the client agent 230. In step 2019, client agent 230 transmits the user input on the Destination List to the server agent 210. In step 2021, server agent 210 transmits the user input on the Destination List to the server application 220 associated with the Destination List.

In some embodiments, the system may use the same App ID generated by the system or a different App ID that may be generated by the client agent 230. The App ID must be unique and there should be a one-to-one mapping to the server-side App ID used by the published application 220. In some embodiments, the client agent 230 performs the mapping, ensuring that the App ID is valid and unique. If the App ID is different, then there is no Taskbar Grouping between local and remote instances of the same app, which may be desirable. In some embodiments, Destination Lists are static (created at app install time), others change dynamically. In some embodiments, with the created Destination List, references to the original executable in any Shell Links are replaced with references to the local Stub executable for the Destination List, followed by the original executable reference in the form of a command-line parameter to the local Stub executable. In some embodiments, the client agent 230 only configures the Stub Executable. The OS Shell then calls it based on user input, FTAs, or similar event.

In some embodiments, the server agent 210 launches the hosted application 220 and detects process and window creation. The server agent 210 initiates Destination List remoting. Destination Lists may be defined based on application user model identifiers (also known as App ID) which can be assigned per process but may also exist per window. The same process may have more than one Destination List if different windows of that process have different App IDs assigned. Additionally, App IDs might be explicitly set in the Destination List using methods such as ICustomDestinationList interface or SHAddToRecentDocs. The server agent 210 finds the App ID of the external process of the published application or its window. The server agent 210 generates the file names where the Custom or Automatic Destination Lists for the application are stored. The server agent 210 parses the Destination List information from the Custom or Automatic Destination List files used as a data store by the operating system. It converts the data from the operating system format to the remote presentation layer protocol format. The server agent 210 sends the Destination List information to the client agent 230. In some embodiments, the client information may include a host process identifier and/or a window identifier, an App ID (which may also serve as a unique identifier for the Destination List), a flag indicating if the App ID is explicit (set by the application 220) or implicit (system-generated or server agent 210 generated), Destination List type (Custom or Automatic), File Type Associations (including FTA extensions and icons), and full Destination List information, which may include version, array of categories, array of shell items and shell links within each category, array of properties for each shell item or shell link (such as icons, display title, document or executable path, arguments). In some embodiments, the icons for shell items are explicitly added while marshaling the Destination List protocol, although it can be added as a reference. The icons for shell links may be retrieved from the FTA.

In some embodiments, the server agent 210 interacts with multiple interfaces or APIs in order to receive real time event notifications for when Destination Lists change. Upon such notification, the server agent initiates communication with the client agent 230 to transmit updates and related information. In some embodiments, the server agent 210 may hook interfaces or APIs. The hooked interfaces may include the ICustomDestinationList interface, which may affect the refreshing of both the Custom and Automatic Destination List files. Some of the methods of the ICustomDestination-List interface may include CommitList, which completes the Destination List transaction and declares the new list ready for display. The server agent 210 may need to refresh it from the file and notify the client 102. Another interface method that may be utilized is the DeleteList, which deletes the Destination List. The server agent 210 may need to send a blank list to the client 102. In some embodiments, a hooked interface method may be SetAppID, which sets the unique App ID for the Destination List. This is the App ID for the Destination List used by the application process, which may generate more than one Destination List. One example is Internet Explorer 9, which generates an AppID per website tab. Another API that may be utilizes is the SHAddToRecentDocs, which affects the refreshing of the Automatic Destination file only. The client agent 230 receives the Destination List over a virtual channel from the server agent 210. The client agent 230 creates a Stub executable to represent the remote application 220. In some embodiments, the client agent 230 reuses an existing Stub executable. In some embodiments, a remote presentation protocol client engine executable may be used as the stub executable, which would work for all the items in the Destination List, except for the Default Taskbar Tasks. In some embodiments, low-level API hooking on the client Shell may be used to fix the visual appearance (for application icons and text) as well as ensure that proper context exists for pinning. In some embodiments, separate Stub executable are used, one for each Destination List. The client agent 230 may configure or register the stub executable. In some embodiments, the client agent 230 may configure or register the Stub executable using the name to match the published application 220, icon to match the published application 220, and App ID to match the Destination List. In some embodiments, the App ID could be either of the following, depending on the configuration or usability requirements: the same App ID provided by the server agent 210, an App ID generated by the client 102 based on process module information for the local application corresponding to the remotely executing application 220, or a unique client-generated App ID. The App ID generated by the client can be used if an explicit App ID is not provided by the server 106, which has the benefit of avoiding potential differences in system-generated App IDs on different operating system versions at the client 102 and the server 106. The client agent 230 maintains a mapping table between the client-generated App ID and the explicit App ID or App ID generated based on process module information. The approach for maintaining a mapping table is necessary to ensure that there is not grouping between local and remote instances of the same application (i.e. there is no sharing of the Destination List between local and remote applications). This may be desirable for simplicity of Destination List handling or usability reasons as illustrated in FIG. 11A.

The client agent 230 may configure the stub executable so that the FTAs match the published application 220. FTA registration may include the respective App ID associated with the Destination List and icon that will be shown in Shell Links. The client agent 230 may configure the stub executable to call SHChangeNotify to notify the local shell that the FTAs have changes.

The client agent 230 may create a local instance of the Destination List file based on the data received from the server agent 210. The App ID used may be different for the local instance, as described above. References to the original executable in any Shell Links are replaced with references to the local stub executable for the Destination List, followed by the original executable reference in the form of a command line parameter to the local Stub executable. This ensures that the local stub executable is called and it can then opaquely forward the shell link for processing to the server 106. The original document or content, or URL references in the Shell Items may be preserved. The client agent 230 generates the file names where the Custom or Automatic Destination Lists for the application 220 are stored. The client agent 230 converts the data from the remote presentation layer protocol to the operating system-private format and fills the Destination List information into the custom or automatic Destination List files used as a data stored by the operating system.

In some embodiments, the ICustomDesintationList interface and/or SHAddToRecentDocs API can be used to create the Custom or Automatic Destination List files used by the local shell. A benefit of this approach is that if a Destination List changes dynamically during the lifetime of a remote application 220, the CommitList method of the ICustomDestinationList interface will not only create a new Destination List file but will also trigger event to the local Shell to refresh the Destination List's visual representation.

In some embodiments, when a user interacts with the icon of the local application on the local taskbar, such as through a right-click, the action causes the Shell to read the Destination List files for its App ID and presents the Destination Lists as mini start menus for the application 220. In some embodiments, the user may right-click on a pinned shortcut to a remotely executing application 220 or a local application if grouping with local applications is desired and performed. In some embodiments, any action that involves launching the stub executable might also involve authenticating to enumerate and launch the application 220, if it is not already running.

In some embodiments, the launching of the application 220 triggers the stub executable registered for the Destination List, which in turn request the client agent 230 to launch the application 220 over a remote presentation layer protocol. In some embodiments, pinning and/or unpinning is applied on the stub executable. Launching of the application 220 from a pinned shortcut works identically to directly launching the application 220. In some embodiments, the "Close Window" or "Close All Windows" option closes the application windows, which may trigger disconnection from the remote session.

In some embodiments, the FTA processing is invoked by the OS Shell. In some embodiments, the processing is invoked via ShellExecute/ShellExecuteEx/CreateProcess, which ultimately launches the stub executable with the original Shell Item as an argument. The stub executable then delegates the request to the client agent 230, which forwards it opaquely to the published application 220 in the host session.

In some embodiments, the shell executes the modified shell link via CreateProcess, which triggers the Stub executable followed by the remaining path (the original Shell Link) as a command-line parameter. The stub executable then delegates the request to the client agent 230, which forwards it opaquely to the published application 220 on the server 106.

In some embodiments, when the application 220 terminates, the respective client destination files will be deleted unless grouped with local applications or unless there is a pinned shortcut to a published application 220. In some embodiments, the stub executable is registered as host processes and the default taskbar tasks are trimmed down to a "Close Window" only option, which prevents pinning, as shown in FIG. 13.

In some embodiments, the App ID is a string identifier assigned to processes or windows of an application either explicitly by the application itself, or generated by the Operating System. Buttons are grouped on the OS Taskbar based on this ID. Destination Lists are also assigned per App ID. The App ID helps group together application windows on the taskbar, regardless of whether those windows are hosted by a single or multiple processes with same or different names or modules. In some embodiments, the App ID is public and controls grouping. The grouping is enforced by the OS Shell and applies to windows and shortcuts. Logically, Destination Lists are also assigned per App ID, since they are presented from a Taskbar button group.

App IDs can be set on several different objects. For instance, App IDs can be set on shortcuts, processes, Destination Lists, FTA registration, and windows. Not all applications set App IDs, such as the Microsoft applications Calculator and Paint. When the App ID is not explicitly set, grouping is done based on an OS shell system-generated/internal App ID. The mechanism is private and derived from process information. In some embodiments, the server agent 210 determines whether the application window has an explicit App ID. If one does exist, it can be retrieved using a method of the shell to retrieve the explicit App ID. In some embodiments, the server agent 210 may query the window's PKEY_AppUserModel_ID property using the public IPropertyStore Shell interface, GetValue( ) method to retrieve it. In other embodiments, the server agent 210 may retrieve the explicit App ID by hooking ICustomDestinationList::SetAppID( ) and SHAddToRecentDocs( ) in case these methods are used to set an explicit App ID. If an explicit App ID does not exist, the server agent 210 checks the window's owner process for an App ID. In some operating systems, a query is only available on the current process, e.g. the GetCurrentProcessExplicitAppUserModelID API, and can only be used in the context of the calling process and cannot be used by a server agent since it may need to query other processes. Therefore in some embodiments the server agent 210, may use a low-level method to retrieve an undocumented structure in order to retrieve the App ID. By way of example, but without limitation, in some embodiments, the server agent 210 may use an API provided by the operating system, such as the NtQueryInformationProcess API provided in some versions of Microsoft Windows in the ntdll.dll library. By using a decimal parameter value of 50 for the parameter ProcessInformationClass, the server agent 210 may retrieve a structure of struct {UINT nAppIdLaunchFlags; USHORT nBufferLengthInBytes; WCHAR szAppUserModelID[1];}. In one embodiment, the nAppIdLaunchFlags may comprise a bitmask with flags indicating whether the szAppUserModelId string refers to a process' explicit App ID. In one such embodiment, a hexadecimal flag of 0x1000 being set may indicate that the App ID is explicitly set in the szAppUserModelId field. If the flag is not set, in this embodiment, the szAppUserModelId field may be ignored.

In some embodiments, if an explicit App ID is not available, then either the server agent 210 or the client agent 230 can generate an App ID. In some embodiments, the App ID is generated by expanding environment strings to complete local paths, and replacing known file paths with known folder GUIDs representing these file paths, using the FindFolderFromPath( ) method of the IKnownFolderManager interface, which returns a special GUID type known as a KNOWNFOLDERID. In some embodiments, the server agent 210 or the client agent 230 converts the GUID value to a string, e.g. using the StringFromGUID2 API, and concatenates the known folder segments of the process module file path with the rest of the file path. For example, given an unaltered, unexpanded host process module file path of "% ProgramFiles %\Internet Explorer\iexplore.exe", the server agent 210 or the client agent 230 first expands this to "C:\Program Files\Internet Explorer\iexplore.exe". Then it uses the IKnownFolderManager interface as described above to replace the "C:\Program Files" known folder segment of the path with "{7C5A40EF-A0FB-4BFC-874A-C0F2E0B9FA8E}" (the KNOWNFOLDERID GUID value for this specific folder), and then concatenates it with the rest of the path, yielding the following complete pseudo-system-generated App ID: "{7C5A40EF-A0FB-4BFC-874A-C0F2E0B9FA8E}\Internet Explorer\iexplore.exe". This is the App ID value used by the client agent 230. In some embodiments, the App ID value, which is either explicit or pseudo-system-generated as described above, is used by the client agent 230 and the server agent 210. Once the App ID is properly set for a local window and a Stub executable, then the OS Shell automatically does the grouping of windows and shortcuts. Also, once the App ID is properly set for a Destination List, the OS Shell automatically associates it with the respective Taskbar button group.

For Shell Item handling (e.g. document handling) an application 220 must register an FTA. Otherwise the document will not appear in the Destination List for the application 220. The client agent 230 configures or registers the Stub executable with FTAs to match the published application 220. FTA registration also includes the respective App ID associated with the Destination Lists.

Example FTA registration details:
Remote app: Notepad.exe
Local Stub Exe: NotepadStub.exe
FTA extension: .txt
  Registry updates:
[HKEY_CLASSES_ROOT\.txt\OpenWithProgids]
  "Citrix.Receiver.NotepadProgID"=hex(0):
[HKEY_CLASSES_ROOT\Citrix.Receiver.NotepadProg
  ID]"FriendlyTypeName"="Text Document (Hosted)
  ""AppUserModelID"="<Remote Notepad's App ID>"
  Note: The above <Remote Notepad's App ID> is the hosted Notepad's App ID, if grouping with local apps, or another unique App ID generated by the client agent 230, if not grouping with local applications. This is consistent with the Destination List's App ID used by the client agent 230.
[HKEY_CLASSES_ROOT\Citrix.Receiver.NotepadProg
  ID\CurVer]@="Citrix.Receiver.NotepadProgID"

[HKEY_CLASSES_ROOT\Citrix.Receiver.NotepadProg
    ID\DefaultIcon]@="C:\\Program Files\\Citrix\\Self-service Plugin\\NotepadStub.exe"
Note: Another icon location can also be used.
[HKEY_CLASSES_ROOT\Citrix.Receiver.NotepadProg
    ID\shell]@="Open"
[HKEY_CLASSES_ROOT\Citrix.Receiver.NotepadProg
    ID\shell\Open]
[HKEY_CLASSES_ROOT\Citrix.Receiver.NotepadProg
    ID\shell\Open\Command]@="C:\\Program Files\\Citrix\\Self-service Plugin\\NotepadStub.exe /HandleDocument:%1"

This FTA registration ensures that the local Stub executable (NotepadStub.exe) is called for .txt files and it then forwards the Shell Item to the client agent 230, which can then opaquely forward the Shell Item for processing to the server 106.

In some embodiments, Automatic and Custom destinations are stored by the Shell into an internal data store in the form of .customDestinations-ms and .automaticDestinations-ms files per App ID. Destination Lists per App ID are merged from the respective automatic and custom lists. This paradigm is used to keep the user interface responsive as there is no need for the Taskbar to launch and ask the application 220 for its list. Instead, it can be directly retrieved from the data store. Additionally, the paradigm permits concurrency, where reading from or writing to the list is done in a transaction-based model. The application 220 calls ICustomDestinationList::BeginList, builds the list by adding custom or known categories, and eventually calls ICustomDestinationList::CommitList. The Shell receives an event and refreshes the Destination List for that App ID. While a new Destination List is being built, the Shell can show the old/current Destination List.

In some embodiments, the systems described herein provide shell integration for thumbnail toolbars for applications 220 executing remotely on a server 106. A server agent 210 executing on a server 106 launches an application 220 responsive to a request from a client computing device 102. The server agent 210 detects a window created by the launched application 220. The server agent 210 extracts an application identifier from the created window. The server agent 210 transmits the application identifier to a client agent 230 executing on a client device 102. The client agent 230 creates a local window comprising a button on a local taskbar of the client device 102 using the received application identifier. In some embodiments, the server agent 210 does not extract an application identifier from the created window. In some embodiments, the created window does not contain an explicit application identifier. In some embodiments, extracting an application identifier is unnecessary as a new application identifier will be generated for the local window on the client device 102. The server agent 210 sends a message received from the client agent 230 received via the button on the local taskbar of the client device to the launched application 220. The server agent 210 intercepts a plurality of images comprising buttons specified by the launched application 220. The server agent 210 transmits one of the plurality of images to the client device 102. The client agent 230 uses one of the received images from the server agent as a button in the local window. The server agent 210 transmits to the launched application 220 user input received from the client agent 230 via the displayed button on the local window. The server agent 210 transmits to the client agent 230 a message generated by the launched application responsive to the user input. The client agent 230 updates the button responsive to the message received from the server agent 210.

In some embodiments, the server agent 210 launches a hosted application 220 and detects process and window creation. The server agent 210 sends protocols to the client agent over a virtual channel. The client agent 230 creates a local window, which receives a button on the local client taskbar. The client taskbar sends a message to the client window notifying it that a taskbar button has been created for the client window. In some embodiments the message is the TaskbarButtonCreated message. The message is transmitted to the server agent 210. The server agent 210 emulates the taskbar and sends the message to the corresponding application window 220 in the user session. The application 220 sets the image list. In some embodiments, the image list may contain up to seven buttons. In some embodiments, the image of each button is in its default active state. The server agent 210 intercepts the call by the application 220 to set the image list, e.g., a ITaskbarList3::ThumbBarSetImageList method call, and transmits the images to the client agent 230. The client agent 230 uses the received images and generates a call to set the image list on the corresponding local window, e.g. calls the ITaskbarList3::ThumbBarSetImageList method. The application 220 adds buttons by making a call, e.g. a ITaskbarList3::ThumbBarAddButtons call, to add buttons to the thumb bar. The server agent 210 intercepts the call to add buttons to the thumb bar and transmits the call to the client agent 230. The call transmitted from the server agent 210 to the client agent 230 may include a button identifier, an image (as an index into the previously set list or an explicit icon), a tool tip, state (such as SHOWN, HIDDEN, ENABLED, DISABLED, DISMISS-ON-CLICK, NO BACKGROUND, NON-INTERACTIVE), or any combination of the above. The client agent 230 generates a call, e.g., a ITaskbarList3::ThumbBarAddButtons call, to add thumb bar buttons on the corresponding local window and the buttons are created with the local taskbar. The buttons are shown when the user activates a thumbnail preview of the application 220. The local toolbar itself provides visuals for various states of the button, such as CLICKED, DISABLED, and HOVER.

When a button in a thumb nail toolbar is clicked, the local window associated with the thumbnail is sent a message. For instance, the message may be a WM_COMMAND message with the HIWORD of its wPARAM parameter set to be THBN_CLICKED and the LOWORD to the button ID. The client agent 230 sends the message to the server 106. The server agent 210 emulates the taskbar and sends the message to the corresponding application window in the user session. The application 220 may decide to update the buttons as a result of user action or some other event. In some embodiments, the application calls the ITaskbarList3::ThumbBarUpdateButtons method as needed to show or hide buttons, enable or disable individual buttons. The server agent 210 intercepts the call to the ITaskbarList3::ThumbBarUpdateButtons method and transmits the new button states to the client agent 230. The client agent 230 calls ITaskbarList3::ThumbBarUpdateButtons on the corresponding local window and the buttons are updated with the local taskbar. The user may exit the Thumbnail preview, in which case the buttons disappear along with the preview. The application 220 eventually destroys its window, which causes the local window to be destroyed, which causes the buttons to be removed from or with the local taskbar.

In some embodiments, the systems described herein provide shell integration for overlay icons for applications 220 executing remotely on a server 106. In some embodiments, the server agent 210 executing on a server 106 launches an application 220 responsive to a request from a client device 102. The server agent 210 detects a window created by the launched application 220. The server agent 210 extracts an application identifier from the window. The server agent 210 transmits the application identifier to a client agent 230 executing on a client device 102. The launched application 220 creates a status indicator indicating the status of the application. The server agent 210 transmits the status indicator intercepted from the launched application 220. The client agent 230 creates a local window corresponding to the launched application 220 using the received application identifier. The client agent 230 overlays the received status indicator on a taskbar icon corresponding to the launched application 220 in the local window.

In some embodiments, a message is generated and transmitted from the client 102 to the server 106 notifying the launched application 220 that a taskbar button has been created for the client window. In some embodiments, the application 220 sets the overlay icon, e.g. using a ITaskbarList3::SetOverlayIcon call. The server agent 210 intercepts the call and the overlay icon from the application 220 and transmits it to the client agent 230. In some embodiments, the server agent 210 intercepts and transmits to the client 102 the host window handle, which the client 102 translates to the local window handle. In some embodiments, the server agent 210 intercepts and transmits the overlay icon. Null can be used to remove a previous overlay icon. In some embodiments, the server agent 210 intercepts and transmits a description that may be used for accessibility purposes. In some embodiments, the client agent 230 calls a method, e.g. ITaskbarList3::SetOverlayIcon, to set the overlay icon on the corresponding local window and the overlay icon is applied with the local taskbar button.

In some embodiments, the systems described herein provide shell integration for progress bars for applications 220 executing remotely on a server 106. A server agent 210 executing on a server 106 launches an application 220 responsive to a request from a client device 102. The server agent 210 detects a window created by the launched device 220. The server agent 210 extracts an application identifier from the window. The server agent 210 transmits the application identifier to a client agent 230 executing on a client device 102. The client agent 230 creates a local window corresponding to the launched application using the received application identifier. The server agent 210 transmits a progress state or progress value of the application 220. The launched application 220 displays the progress state or progress value of the application 220 on a taskbar icon on the client computing device 102 corresponding to the local window of the launched application 220.

In some embodiments, seamless window creation proceeds as normal and a message is generated and sent from the client 102 to the server 106 notifying the launched application 220 that a taskbar button has been created for the client window. The application 220 sets the progress state and/or the progress value, e.g. by calling ITaskbarList3::SetProgressState and/or ITaskbarList3::SetProgressValue methods. In some embodiments, the server agent 220 intercepts the calls and the progress state and/or progress value of the application 220 and transmits the information to the client 102. In some embodiments, the server agent 210 intercepts and transmits a host window handle, which the client agent 230 translates to the local window handle of the client device 102. In some embodiments, the server agent 210 intercepts and transmits the state of the application 220. In some embodiments, the state of the application 220 may include a value of INDETERMINATE, NORMAL, ERROR, PAUSED or NO PROGRESS.

In some embodiments, the server agent 210 intercepts and transmits to the client computing device 102 a progress value of the application 220. In some embodiments, the progress value may include a host window handle, which the client 102 translates to the local window handle, a proportion value indicating completion progress, and a value specifying the value proportion will have when the operation is complete. In some embodiments, the client agent 102 may call one or both of the methods for progress state or progress value of the application 220 on the corresponding local window. For example, the client agent 102 may call ITaskbarList3::SetProgressState and/or ITaskbarList3::SetProgressValue methods, and the progress state or value is applied with the local taskbar button.

For simplicity, the systems and methods described herein assume Seamless window mode and server-hosted applications. It is to be understood that the same techniques, and without any limitations, apply to Reverse Seamless mode and Client Hosted Applications, except that the roles of the client agent 230 and the server agent 210 are reversed. In Reverse Seamless mode the Destination Lists, Thumbnail toolbars, Overlay icons and Progress bars of Client Hosted Applications are seamlessly integrated into the remote server's Shell, e.g., the VDA's Taskbar.

In some embodiments, a user of a local machine 102 connects to a remote machine 106 and views a display on the local machine 102 of a local version of a remote desktop environment, comprising a plurality of data objects, generated on the remote machine 106 and an application 220 or other resource accessible via an integrated desktop environment—both those resources generated on the local machine 102 and those generated on the remote machine 106—is shown on the remote desktop environment as if it were executing on, or executable from, the remote desktop environment. In one of these embodiments, a component on the local machine 102 (e.g., the client agent 230) integrates remotely generated windows into a local desktop environment. In another of these embodiments, a component on the remote machine 106 integrates windows generated on the local machine 102 into a desktop environment generated by the remote machine 106. In still another of these embodiments, although the local machine 102 is described above as the machine accessed by a user and the remote machine 106 is described above as the machine that transmits window attribute data and output data for integration by the local machine 102, the inverse is implemented—that is, the local machine 102 provides the functionality described above as provided by the remote machine 106 (including, for example, gathering and transmitting process data for integration into a desktop environment) while the remote machine 106 provides the functionality described above as provided by the local machine 102 (including, for example, receiving process identification data and directing the integration of the received data into a desktop environment).

While certain exemplary embodiments have been described and shown in the accompanying drawings, it is to be understood that such embodiments are merely illustrative of and not restrictive on the methods and systems described herein. Additionally, it is possible to implement the methods and systems described herein or some of its features in hardware, programmable devices, firmware, software or a combination thereof. The methods and systems described herein or parts of the methods and systems described herein may also be embodied in a processor-readable storage medium or machine-readable medium such as a magnetic (e.g., hard drive, floppy drive), optical (e.g., compact disk, digital versatile disk, etc), or semiconductor storage medium (volatile and non-volatile).

The invention claimed is:

1. A method comprising:
   receiving, at a local computing device, an application identifier and a destination list from a remote computing device, said application identifier and destination list corresponding to an application executing on the remote computing device;
   instantiating, at the local computing device, a stub executable program based on the application identifier of the application executing on the remote computing device;
   configuring the stub executable program using the destination list;
   outputting for display a user interface item corresponding to the destination list;
   intercepting, at the local computing device via the user interface item, a user input; and
   in response to intercepting the user input, executing the stub executable program and sending, by the stub executable program, the user input to the remote computing device.

2. The method of claim 1, wherein the destination list comprises at least one of items or links corresponding to the application.

3. The method of claim 1, further comprising assigning, at the local computing device, a same application identifier to the stub executable program as the application identifier of the application executing on the remote computing device.

4. The method of claim 1, further comprising:
   receiving, at the local computing device, an updated destination list from the remote computing device; and
   updating the output destination list based on the received updated destination list.

5. The method of claim 1, wherein the application is a web browser, and wherein said received destination list corresponds to a web site received by the web browser.

6. The method of claim 1, further comprising:
   requesting, by the local computing device, execution of the application on the remote computing device.

7. One or more non-transitory computer readable media storing computer executable instructions that, when executed by a hardware processor, cause a local computing device to:
   receive an application identifier and a destination list from a remote computing device, said application identifier and destination list corresponding to an application executing on the remote computing device;
   instantiate a stub executable program based on the application identifier of the application executing on the remote computing device;
   configure the stub executable program using the destination list;
   output for display a user interface item corresponding to the destination list;
   intercept, via the user interface item, a user input; and
   in response to intercepting the user input, execute the stub executable program and send, by the stub executable program, the user input to the remote computing device.

8. The one or more non-transitory computer readable media of claim 7, wherein the destination list comprises at least one of items or links corresponding to the application.

9. The one or more non-transitory computer readable media of claim 7, said media further comprising instructions for assigning, at the local computing device, a same application identifier to the stub executable program as the application identifier of the application executing on the remote computing device.

10. The one or more non-transitory computer readable media of claim 7, said media further comprising instructions for:
    receiving, at the local computing device, an updated destination list from the remote computing device; and
    updating the output destination list based on the received updated destination list.

11. The one or more non-transitory computer readable media of claim 7, wherein the application is a web browser, and wherein said received destination list corresponds to a web site received by the web browser.

12. The one or more non-transitory computer readable media of claim 7, said media further comprising instructions for requesting execution of the application on the remote computing device.

13. An apparatus comprising:
    at least one hardware processor;
    a network interface configured to communicate, via network, with a remote computing device; and
    memory storing computer-readable instructions that, when executed by the at least one hardware processor, cause the apparatus to:
      receive an application identifier and a destination list from the remote computing device, said application identifier and destination list corresponding to an application executing on the remote computing device;
      instantiate a stub executable program based on the application identifier of the application executing on the remote computing device;
      configure the stub executable program using the destination list;
      output for display a user interface item corresponding to the destination list;
      intercept, via the user interface item, a user input; and
      in response to intercepting the user input, execute the stub executable program and send, by the stub executable program, the user input to the remote computing device.

14. The apparatus of claim 13, wherein the instructions, when executed by the at least one hardware processor, further cause the apparatus to: assign a same application identifier to the stub executable program as the application identifier of the application executing on the remote computing device.

15. The apparatus of claim 13, wherein the instructions, when executed by the at least one hardware processor, further cause the apparatus to:
    receive an updated destination list from the remote computing device; and
    update the output destination list based on the received updated destination list.

16. The apparatus of claim 13, wherein the application is a web browser, and wherein said received destination list corresponds to a web site received by the web browser.

17. The apparatus of claim 13, wherein the instructions, when executed by the at least one hardware processor, further cause the apparatus to:
    request execution of the application on the remote computing device.

* * * * *